(12) United States Patent
Nagumo

(10) Patent No.: US 8,369,649 B2
(45) Date of Patent: Feb. 5, 2013

(54) IMAGE PROCESSING APPARATUS, IMAGE PROCESSING METHOD, AND COMPUTER PROGRAM FOR PERFORMING SUPER-RESOLUTION PROCESS

(75) Inventor: Takefumi Nagumo, Kanagawa (JP)

(73) Assignee: Sony Corporation, Tokyo (JP)

( * ) Notice: Subject to any disclaimer, the term of this patent is extended or adjusted under 35 U.S.C. 154(b) by 1189 days.

(21) Appl. No.: 12/204,712

(22) Filed: Sep. 4, 2008

(65) Prior Publication Data
US 2009/0092337 A1 Apr. 9, 2009

(30) Foreign Application Priority Data

Sep. 7, 2007 (JP) ................................ P2007-232930

(51) Int. Cl.
G06K 9/40 (2006.01)
G06K 9/32 (2006.01)
(52) U.S. Cl. ........................................ 382/275; 382/299
(58) Field of Classification Search .................. 382/299, 382/275
See application file for complete search history.

(56) References Cited

U.S. PATENT DOCUMENTS

| | | | |
|---|---|---|---|
| 5,696,848 A * | 12/1997 | Patti et al. | 382/254 |
| 7,206,027 B2 * | 4/2007 | De Haan et al. | 348/448 |
| 7,248,628 B2 * | 7/2007 | Shaeffer | 375/229 |
| 7,352,919 B2 * | 4/2008 | Zhou et al. | 382/299 |
| 7,990,428 B2 * | 8/2011 | Yano et al. | 348/222.1 |
| 8,135,234 B2 * | 3/2012 | Tourapis et al. | 382/275 |
| 2005/0244081 A1 * | 11/2005 | Zhou et al. | 382/299 |
| 2007/0172104 A1 * | 7/2007 | Nishide et al. | 382/131 |
| 2008/0175509 A1 * | 7/2008 | Wheeler et al. | 382/260 |
| 2009/0060373 A1 * | 3/2009 | Perera et al. | 382/264 |
| 2010/0220939 A1 * | 9/2010 | Tourapis et al. | 382/261 |
| 2010/0253796 A1 * | 10/2010 | Yano et al. | 348/222.1 |

FOREIGN PATENT DOCUMENTS

| | | |
|---|---|---|
| JP | 2006-221220 | 8/2006 |
| WO | WO 03038753 A2 * | 5/2003 |
| WO | WO 2006052029 A1 * | 5/2006 |
| WO | WO2007/089803 A2 | 8/2007 |
| WO | WO 2007089803 A2 * | 8/2007 |

OTHER PUBLICATIONS

"Practical Super-Resolution from Dynamic Video Sequences," Zhongding Jiang et al, Proceedings of the 2003 IEEE Computer Society Conference on Computer Vision and Pattern Recognition, 2003, 6 pages.*
"Super-Resolution Image Reconstruction: A Technical Overview," S C Park et al, IEEE Signal Processing Magazine, May 2003, pp. 21-36.*
Michal Irani et al., "Improving Resolution by Image Registration", CVGIP: Graphical Model and Image Processing vol. 53, No. 3, pp. 231-239, May 1991.

* cited by examiner

*Primary Examiner* — Wenpeng Chen
(74) *Attorney, Agent, or Firm* — Finnegan, Henderson, Farabow, Garrett & Dunner LLP

(57) ABSTRACT

An image processing apparatus includes an image correction processing unit configured to correct an input image so as to generate a corrected image and a super-resolution processing unit configured to receive the corrected image generated by the image correction processing unit and increase a resolution of the corrected image through super-resolution processing so as to generate a high-resolution image. The image correction processing unit performs at least one of a time-direction noise removal process, a space-direction noise removal process, a compression noise removal process, and an aperture control correction process.

11 Claims, 19 Drawing Sheets

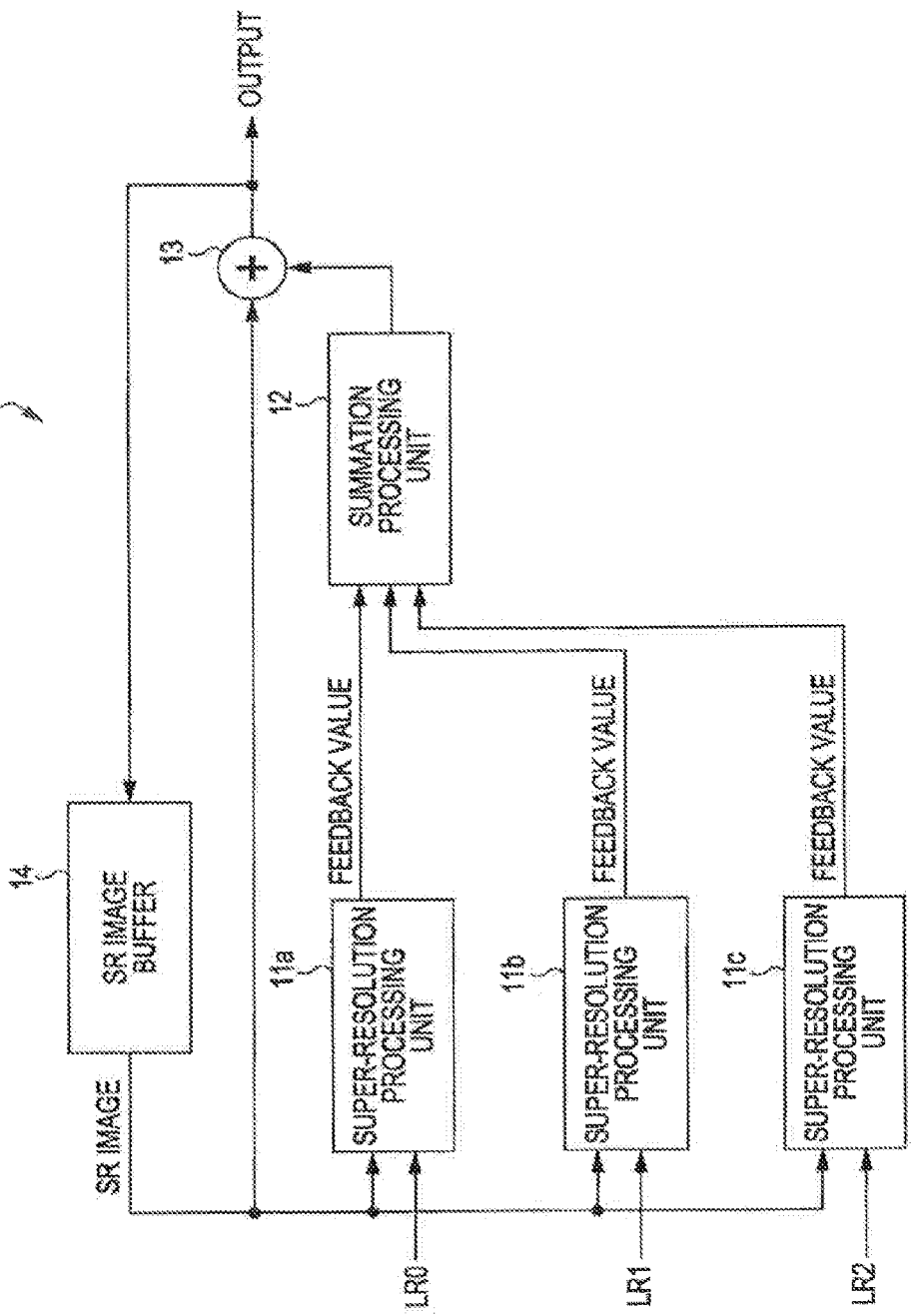

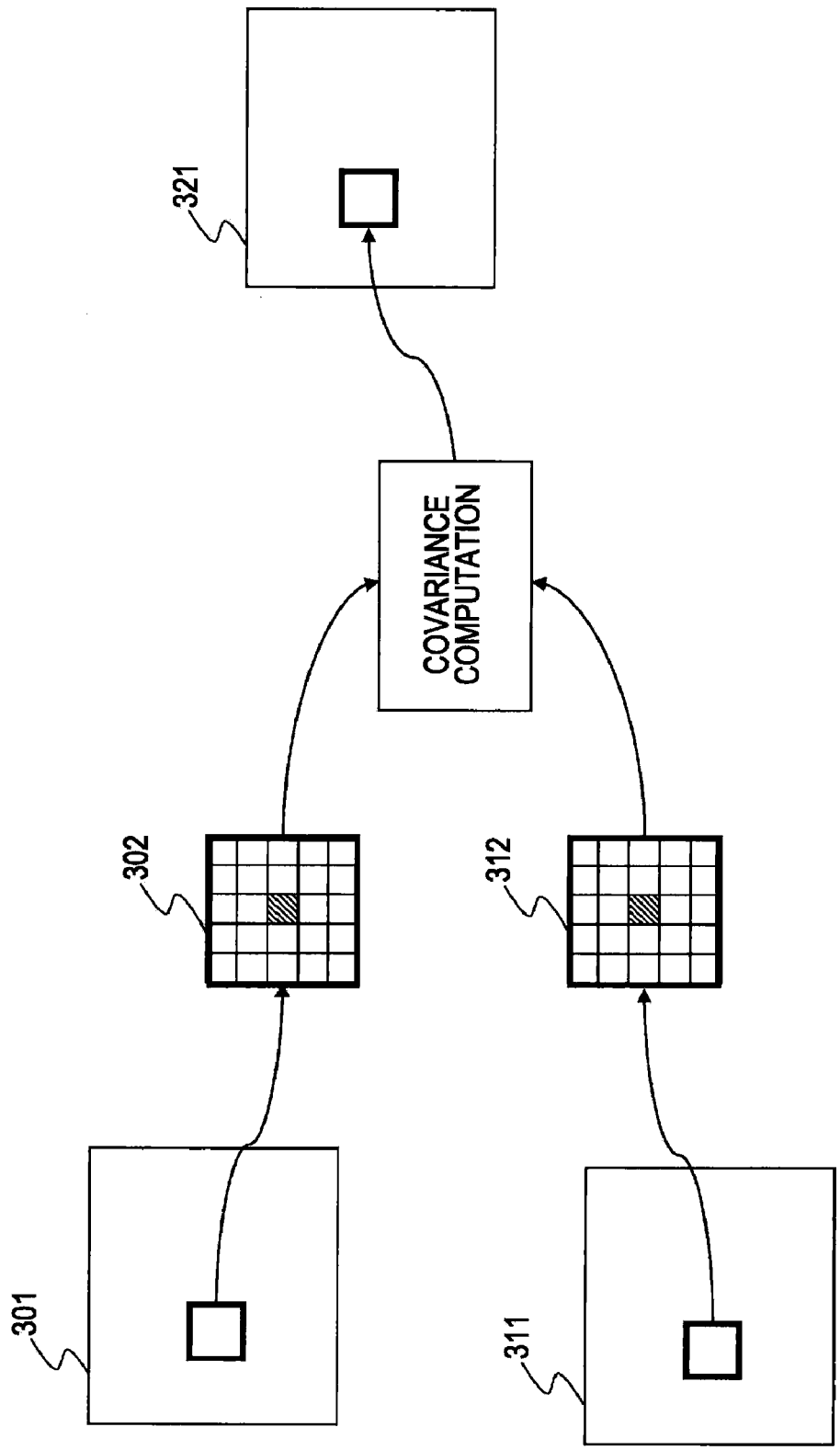

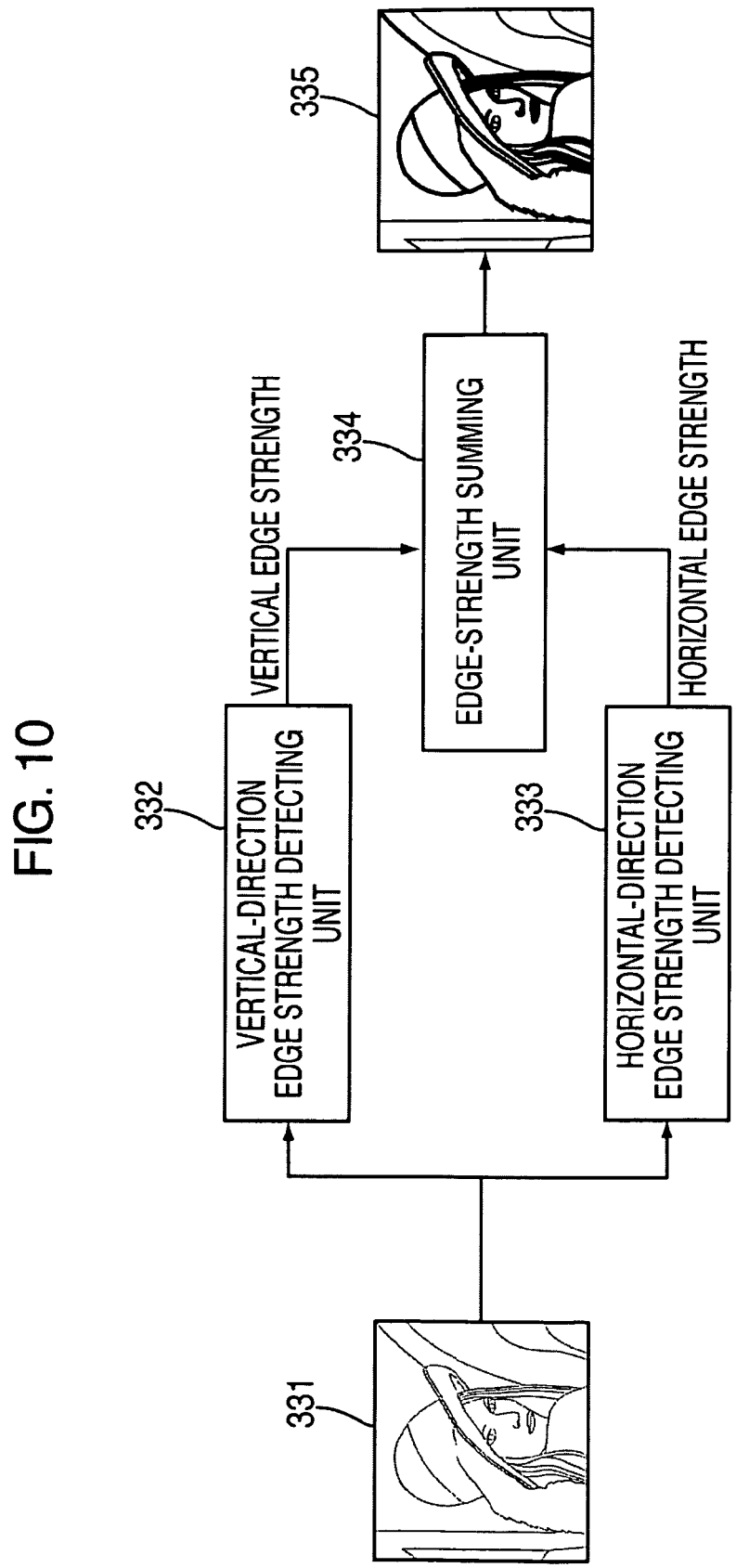

FIG. 11A

| -1 | -2 | -1 |
|---|---|---|
| 0 | 0 | 0 |
| 1 | 2 | 1 |

EDGE STRENGTH IN VERTICAL DIRECTION
VALUE AT CENTER REPRESENTS FILTER COEFFICIENT APPLIED TO PIXEL OF INTEREST

FIG. 11B

| -1 | 0 | 1 |
|---|---|---|
| -2 | 0 | 2 |
| -1 | 0 | 1 |

EDGE STRENGTH IN HORIZONTAL DIRECTION
VALUE AT CENTER REPRESENTS FILTER COEFFICIENT APPLIED TO PIXEL OF INTEREST

FIG. 11C

COMPUTATION EXPRESSION FOR COMPUTING EDGE STRENGTH $$G = \sqrt{G_h^2 + G_v^2}$$

G: EDGE STRENGTH
$G_h$: EDGE STRENGTH IN HORIZONTAL DIRECTION
$G_v$: EDGE STRENGTH IN VERTICAL DIRECTION

FIG. 14

| EDGE STRENGTH | TIME-DIRECTION CORRELATION VALUE | VARIANCE VALUE | NUMBER OF HIGH-LUMINANCE PIXELS & NUMBER OF LOW-LUMINANCE PIXELS | FILTER APPLIED |
|---|---|---|---|---|
| LOW | HIGH | — | — | TIME-DIRECTION GRAIN NOISE REMOVAL FILTER |
| LOW | LOW | HIGH | — | NO FILTERS APPLIED |
| LOW | LOW | LOW | — | SPACE-DIRECTION GRAIN NOISE REMOVAL FILTER |
| HIGH | — | — | SMALL | COMPRESSION NOISE REMOVAL FILTER |
| HIGH | — | — | LARGE | APERTURE CONTROL CORRECTION FILTER |

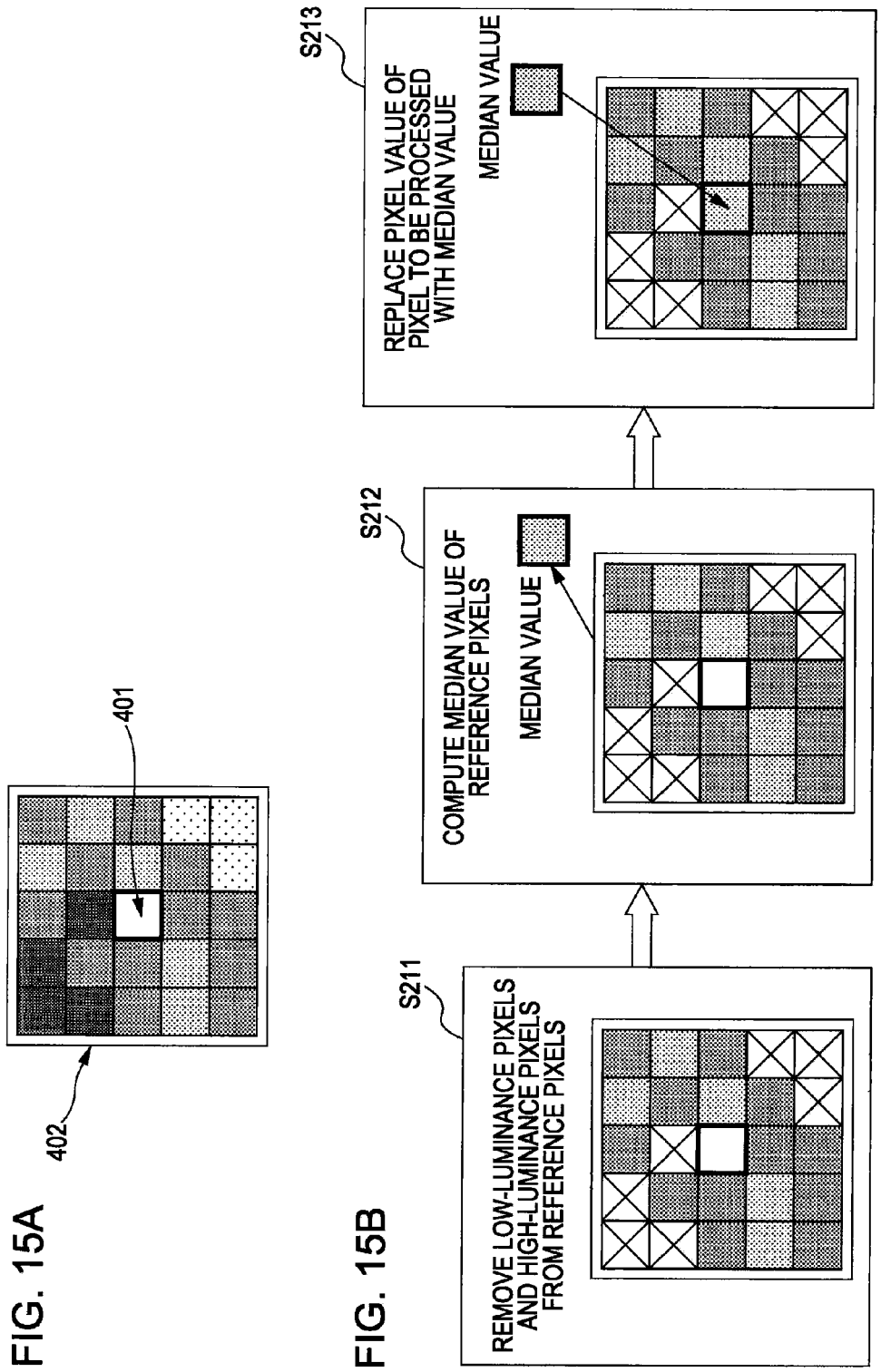

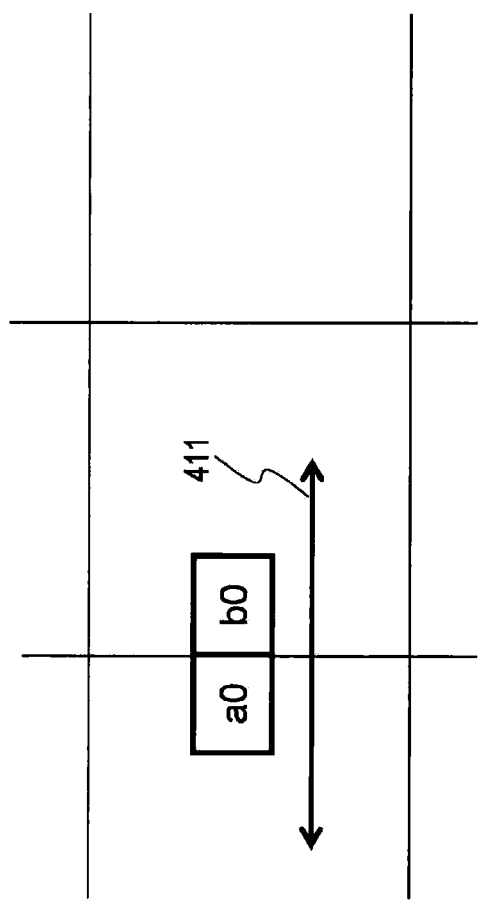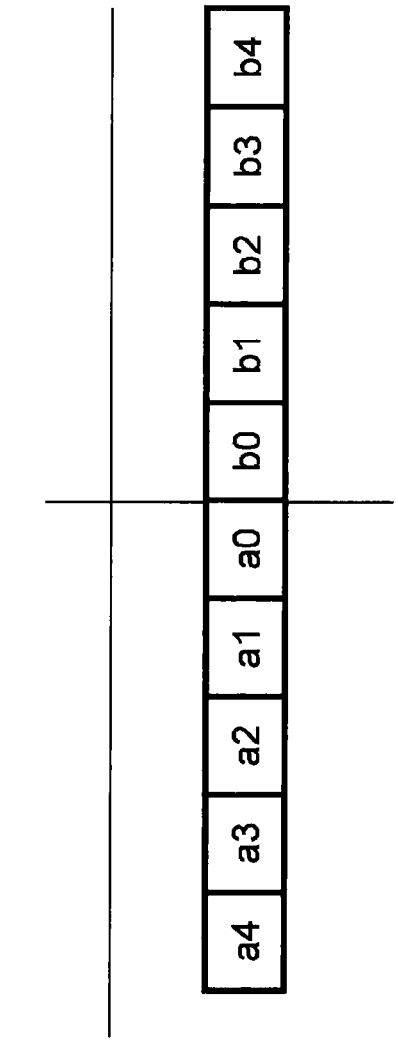
FIG. 16A
FIG. 16B

IMAGE PROCESSING APPARATUS, IMAGE PROCESSING METHOD, AND COMPUTER PROGRAM FOR PERFORMING SUPER-RESOLUTION PROCESS

CROSS REFERENCES TO RELATED APPLICATIONS

The present invention contains subject matter related to Japanese Patent Application JP 2007-232930 filed in the Japanese Patent Office on Sep. 7, 2007, the entire contents of which are incorporated herein by reference.

BACKGROUND OF THE INVENTION

1. Field of the Invention

The present invention relates to an image processing apparatus, an image processing method, and a computer program and, in particular, to an image processing apparatus, an image processing method, and a computer program for performing super-resolution processing for increasing the resolution of an image.

2. Description of the Related Art

Super-resolution processing has been used as a technique for generating a high-resolution image from a low-resolution image. In super-resolution processing, pixel values of pixels of one frame of a high-resolution image are obtained from multiple low-resolution images of the same object.

By using super-resolution processing, after images are captured with an image sensor, such as a charge coupled device (CCD) sensor or a complementary metal oxide semiconductor (CMOS) sensor, an image having a resolution higher than that of the image sensor can be reconstructed from images captured by the image sensor. More specifically, for example, super-resolution processing is used for generating a high-resolution satellite picture. Note that super-resolution processing is described in, for example, "Improving Resolution by Image Registration", Michal IRANI and Shmuel PELEG, Department of Computer Science, The Hebrew University of Jerusalem, 91904 Jerusalem, Israel, Communicated by Rama Chellapa, Received Jun. 16, 1989; accepted May 25, 1990.

The principle of super-resolution is described below with reference to FIGS. 1A, 1B, and 2. Reference symbols a, b, c, d, e, and f shown in the upper sections of FIGS. 1A and 1B represent pixel values of a high-resolution image (a super-resolution (SR) image) to be generated from a low-resolution image (a low resolution (LR) image) obtained by capturing an object. That is, these reference symbols represent the pixel values of pixels generated when the object is pixelated with the same resolution as that of the SR image.

For example, when the width of one pixel of an image sensor is the same as the width of two pixels of the object, an image of the object cannot be captured with the original resolution. In such a case, as shown in FIG. 1A, the pixel at the left among three pixels of the image sensor acquires a pixel value A obtained by mixing the pixel values a and b. The pixel at the middle acquires a pixel value B obtained by mixing the pixel values c and d. In addition, the pixel at the right acquires a pixel value C obtained by mixing the pixel values e and f. Here, the pixel values A, B, and C represent the pixel values of pixels of a captured LR image.

As shown in FIG. 1B, if, due to, for example, camera shake, an image of the object at a position shifted from the position of the object shown in FIG. 1A by 0.5 pixels is captured (is captured while the shift is occurring), the pixel at the left among three pixels of the image sensor acquires a pixel value D obtained by mixing half the pixel value a, the whole pixel value b, and half the pixel value c. The pixel at the middle acquires a pixel value E obtained by mixing half the pixel value a, the whole pixel value d, and half the pixel value e. In addition, the pixel at the right acquires a pixel value F obtained by mixing half the pixel values e and the whole pixel value f. Here, the pixel values D, E, and F also represent the pixel values of pixels of a captured LR image.

As a result of the captured LR images, the following expression (1) can be obtained:

$$\begin{pmatrix} 1 & 1 & 0 & 0 & 0 & 0 \\ 0 & 0 & 1 & 1 & 0 & 0 \\ 0 & 0 & 0 & 0 & 1 & 1 \\ 1/2 & 1 & 1/2 & 0 & 0 & 0 \\ 0 & 0 & 1/2 & 1 & 1/2 & 0 \\ 0 & 0 & 0 & 0 & 1/2 & 1 \end{pmatrix} \begin{pmatrix} a \\ b \\ c \\ d \\ e \\ f \end{pmatrix} = \begin{pmatrix} A \\ B \\ C \\ D \\ E \\ F \end{pmatrix} \quad (1)$$

By computing a, b, c, d, e, and f using expression (1), an image having a resolution higher than that of the image sensor can be obtained.

A method called "Back Projection" is one of super-resolution processing techniques of the related art. Processing using a back projection method is described in detail next with reference to FIG. 2. FIG. 2 is a block diagram of an image processing apparatus 1. For example, the image processing apparatus 1 is mounted in a digital camera. The image processing apparatus 1 processes a captured still image.

As shown in FIG. 2, the image processing apparatus 1 includes super-resolution processing units 11a to 11c, a summation processing unit 12, and an addition processing unit 13, and an SR image buffer 14. For example, a low-resolution LR images LR0, LR1, and LR2 are obtained through an image capturing operation. The LR images LR0 is input to the super-resolution processing unit 11a. The image LR1 is input to the super-resolution processing unit 11b. The image LR2 is input to the super-resolution processing unit 11c. The LR images LR0 to LR2 are successively captured images. The LR images LR0 to LR2 have the overlapping areas therein. In general, when images are successively captured, the areas of an object captured in the images are slightly shifted from one another due to, for example, camera shake. Thus, the images are not the same and partially have areas that overlap one another.

The super-resolution processing unit 11a generates a difference image representing the difference between the low-resolution image LR0 and a high-resolution SR image stored in the SR image buffer 14 and outputs a feedback value to the summation processing unit 12. The feedback value indicates a difference image having a resolution that is the same as that of the SR image.

Note that the SR image buffer 14 stores an SR image that is generated through the immediately previous super-resolution processing. At a time when processing is just started, no frames have been generated. In such a case, an image having a resolution that is the same as that of an SR image is obtained by upsampling the low-resolution image LR0. The obtained image is stored in the SR image buffer 14.

Similarly, the super-resolution processing unit 11b generates a difference image representing the difference between the low-resolution image LR1 of the next frame and a high-resolution SR image stored in the SR image buffer 14 and outputs a feedback value indicating the generated difference image to the summation processing unit 12.

Similarly, the super-resolution processing unit 11c generates a difference image representing the difference between the low-resolution image LR2 of a frame after the next frame and a high-resolution SR image stored in the SR image buffer 14 and outputs a feedback value indicating the generated difference image to the summation processing unit 12.

The summation processing unit 12 averages the feedback values supplied from the super-resolution processing units 11a to 11c so as to generate an image having a resolution the same as that of the SR image. The summation processing unit 12 then outputs the generated image to the addition processing unit 13. The addition processing unit 13 sums the SR image stored in the SR image buffer 14 and the SR image supplied from the summation processing unit 12 so as to generate and output a new SR image. The output of the addition processing unit 13 is supplied to outside the image processing apparatus 1 as a result of the super-resolution processing. In addition, the output of the addition processing unit 13 is supplied to the SR image buffer 14 and is stored in the SR image buffer 14.

FIG. 3 is a block diagram of an exemplary configuration of a super-resolution processing unit 11 (one of the super-resolution processing units 11a to 11c). As shown in FIG. 3, the super-resolution processing unit 11 includes a motion vector detecting unit 21, a motion compensation processing unit 22, a downsampling processing unit 23, an addition processing unit 24, an upsampling processing unit 25, and an inverse motion compensation processing unit 26.

The high-resolution SR image is read out from the SR image buffer 14 and is input to the motion vector detecting unit 21 and the motion compensation processing unit 22. The captured low-resolution image LRn is input to the motion vector detecting unit 21 and the addition processing unit 24.

The motion vector detecting unit 21 detects a motion vector with respect to the SR image using the input high-resolution SR image and low-resolution image LRn. The motion vector detecting unit 21 then outputs the detected motion vector to the motion compensation processing unit 22 and the inverse motion compensation processing unit 26. For example, the motion vector detecting unit 21 performs block matching between an SR image generated on the basis of a previously captured image and the input image LRn so as to generate a vector indicating the destination of movement of each block of the SR image in the input image LRn.

The motion compensation processing unit 22 motion-compensates the high-resolution SR image on the basis of the motion vector supplied from the motion vector detecting unit 21 so as to generate a motion compensation (MC) image. The motion compensation processing unit 22 then outputs the generated motion compensation image (MC image) to the downsampling processing unit 23. As used herein, the term "motion compensation processing" refers to processing in which the positions of pixels of an SR image are moved in accordance with a motion vector, and an SR image having compensated positions of pixels corresponding to those of a newly input image LRn is generated. That is, by moving the positions of pixels of an SR image, the position of an object captured in the SR image is made coincident with the position of the object captured in the image LRn. In this way, a motion compensation image (MC image) can be generated.

The downsampling processing unit 23 downsamples the image supplied from the motion compensation processing unit 22 so as to generate an image having a resolution the same as that of the image LRn. The downsampling processing unit 23 then outputs the generated image to the addition processing unit 24. The operation for obtaining a motion vector from an SR image and an image LRn and making the resolution of an image motion-compensated using the obtained motion vector equal to the resolution of the LR image corresponds to a simulation of a captured image performed on the basis of the SR image stored in the SR image buffer 14.

The addition processing unit 24 generates a difference image indicating the difference between the image LRn and the image simulated in such a manner. The addition processing unit 24 then outputs the generated difference image to the upsampling processing unit 25.

The upsampling processing unit 25 upsamples the difference image supplied from the addition processing unit 24 so as to generate an image having a resolution the same as that of the SR image. The upsampling processing unit 25 then outputs the generated image to the inverse motion compensation processing unit 26. The inverse motion compensation processing unit 26 inverse motion-compensates the image supplied from the upsampling processing unit 25 using the motion vector supplied from the motion vector detecting unit 21. The inverse motion compensation processing unit 26 then outputs a feedback value representing the image obtained through the inverse motion compensation to the summation processing unit 12 shown in FIG. 2. The position of the object captured in the image obtained through the inverse motion compensation is close to the position of the object captured in the SR image stored in the SR image buffer 14.

FIG. 4 illustrates an exemplary configuration of an image processing apparatus 30 that performs such super-resolution processing. In an image quality adjusting unit 32, an image captured by an image capturing unit 31, such as a CCD or CMOS sensor, is adjusted through contrast control and aperture control (edge enhancement). Thereafter, in an image compression unit 33, the image is compressed using a predetermined compression algorithm, such as MPEG compression. Subsequently, the image is recorded on a recording medium 34, such as a digital versatile disc (DVD), a magnetic tape, or a flash memory.

Super-resolution processing is performed when the image stored on the recording medium 34 is decoded and played back. In an image decoding unit 35, decoding processing is performed on the image recorded on the recording medium 34. Thereafter, in a super-resolution processing unit 36, the super-resolution processing described with reference to FIGS. 1 to 3 is performed on the decoded image. Thus, a high-resolution image is generated, and the generated high-resolution image is displayed on a display unit 37.

An output image obtained through this super-resolution processing is not limited to a moving image. For example, the output image may be a still image. In the case of a moving image, a plurality of frame images are used. In contrast, in the case of a still image, continuously captured still images are used. In continuously captured still images, the areas of the captured images may be slightly and gradually shifted relative to one another due to, for example, camera shake. By applying the super-resolution processing described with reference to FIGS. 1 to 3 to continuously captured still images, a high-resolution image can be generated.

While the example shown in FIG. 4 has been described with reference to processing performed by, for example, a video camera or a still camera, the processing can be applied to broadcast image data, such as data used for digital broadcast. By applying the super-resolution processing to a received image in a receiver, a high-resolution image can be generated and output. For example, in an example configuration shown in FIG. 5, a data transmission apparatus 40 transmits a low-resolution image. A data receiving apparatus 50 receives data transmitted from the data transmission apparatus 40 and performs super-resolution processing on the received data so as to generate and display a high-resolution image.

An image quality adjusting unit 42 of the data transmission apparatus 40 controls the quality of an image captured by an image capturing unit 41, such as a CCD or CMOS device, through contrast control and aperture control (edge enhancement). Thereafter, an image compression unit 43 encodes the image using a predetermined compression algorithm, such as MPEG compression. Subsequently, a transmission unit 44 transmits the encoded image.

The data transmitted from the transmission unit 44 is received by a receiving unit 51 of the data receiving apparatus 50. An image decoding unit 52 decodes the received data. Subsequently, a super-resolution processing unit 53 performs the super-resolution processing described with reference to FIGS. 1 to 3 so as to generate a high-resolution image. The high-resolution image is then displayed on a display unit 54.

As noted above, super-resolution processing can be applied to an image captured by a camera or communication image data. However, as described in FIGS. 4 and 5, image data subjected to the super-resolution processing has already been subjected to image quality control, such as contrast adjustment and aperture control (edge enhancement). That is, the image quality is controlled so that subjective image quality is improved and, subsequently, the image is compressed. Accordingly, it is highly likely that the image includes block noise and ringing noise due to the compression.

However, as described in FIGS. 1 to 3, super-resolution processing includes reconstruction of a high-resolution image using a correlation between images among a plurality of images. If super-resolution processing is performed on image data subjected to the above-described processing, such as image quality adjustment and image compression, an image having an excessively increased high-frequency range or increased compression noise may be generated, and therefore, the image quality may deteriorate.

SUMMARY OF THE INVENTION

Accordingly, the present invention provides an image processing apparatus, an image processing method, and a computer program having a configuration for generating a high-resolution image by performing super-resolution processing on image data subjected to image-quality adjustment and image compression so as to be capable of generating a high-quality high-resolution image by correcting an image as pre-processing and performing super-resolution processing on the corrected image.

According to an embodiment of the present invention, an image processing apparatus includes an image correction processing unit configured to correct an input image so as to generate a corrected image and a super-resolution processing unit configured to receive the corrected image generated by the image correction processing unit and increase a resolution of the corrected image through super-resolution processing so as to generate a high-resolution image. The image correction processing unit performs at least one of a time-direction noise removal process, a space-direction noise removal process, a compression noise removal process, and an aperture control correction process.

The image correction processing unit can analyze the features of pixels that form the input image so as to obtain analysis information, and the image correction processing unit can determine the type of image correction process to be applied in accordance with the analysis information.

When analyzing the features of the pixels that form the input image, the image correction processing unit can analyze at least one of time-direction correlation information, edge information, and space-direction pixel feature information so as to determine the type of image correction process to be applied in accordance with the analysis information.

The image correction processing unit can acquire the space-direction pixel feature information in the form of at least one of a maximum pixel value, a minimum pixel value, a variance value, an average value, the number of pixels having a luminance higher than or equal to a predetermined threshold value, and the number of pixels having a luminance lower than or equal to a predetermined threshold value of pixels in a pixel region containing pixels surrounding a pixel to be processed.

The super-resolution processing unit can generate the high-resolution image corresponding to the input image on the basis of a low-resolution image (LR image) received from the image correction processing unit and a high-resolution image (SR image) pregenerated for the previous frame. The super-resolution processing unit can include a high-resolution difference image generating unit, a time-direction noise removal unit, a first addition processing unit, and a second addition processing unit. The high-resolution difference image generating unit can motion-compensate the high-resolution image (SR image) on the basis of a motion vector computed using the high-resolution image (SR image) and the low-resolution image (LR image), generate a difference image between the motion-compensated high-resolution image (SR image) and the low-resolution image (LR image), and generate a high-resolution difference image by performing upsampling and inverse motion compensation on the difference image. The time-direction noise removal unit can perform removal of noise in the time direction from a low-frequency component-removed image of the high-resolution difference image. The first addition processing unit can add an image processed by the time-direction noise removal unit to a low-frequency component image of the high-resolution difference image. The second addition processing unit can add an output of the first addition processing unit to the high-resolution image (SR image) so as to generate the high-resolution image corresponding to the received low-resolution image (LR image).

The time-direction noise removal unit can perform a filtering process using an infinite-duration impulse response (IIR) filter.

According to another embodiment of the present invention, an image processing method for use in an image processing apparatus for performing super-resolution processing is provided. The method includes the steps of correcting an input image so as to generate a corrected image by using an image correction processing unit and receiving the corrected image and increasing a resolution of the corrected image through super-resolution processing so as to generate a high-resolution image by using a super-resolution processing unit. The step of correcting an input image involves performing at least one of a time-direction noise removal process, a space-direction noise removal process, a compression noise removal process, and an aperture control correction process.

In the step of correcting an input image, the features of pixels that form the input image can be analyzed so as to obtain analysis information, and the type of image correction process to be applied can be determined in accordance with the analysis information.

In the step of correcting an input image, when the features of the pixels that form the input image are analyzed, at least one of time-direction correlation information, edge information, and space-direction pixel feature information is analyzed so that the type of image correction process to be applied can be determined in accordance with the analysis information.

In the step of correcting an input image, the space-direction pixel feature information in the form of at least one of a maximum pixel value, a minimum pixel value, a variance value, an average value, the number of pixels having a luminance higher than or equal to a predetermined threshold value, and the number of pixels having a luminance lower than or equal to a predetermined threshold value of pixels in a pixel region containing pixels surrounding a pixel to be processed can be acquired.

In the step of generating a high-resolution image, the high-resolution image corresponding to the input image can be generated on the basis of a low-resolution image (LR image) received from the image correction processing unit and a high-resolution image (SR image) pregenerated for the previous frame. The step of generating a high-resolution image can include generating a high-resolution difference image, removing a time-direction noise, performing first addition, and performing second addition. In the step of generating a high-resolution difference image, the high-resolution image (SR image) can be motion-compensated on the basis of a motion vector computed using the high-resolution image (SR image) and the low-resolution image (LR image), a difference image between the motion-compensated high-resolution image (SR image) and the low-resolution image (LR image) can be generated, and a high-resolution difference image can be generated by performing upsampling and inverse motion compensation on the difference image. In the step of removing a time-direction noise, removal of noise in the time direction from a low-frequency component-removed image of the high-resolution difference image can be performed. In the step of performing first addition, an image processed in the step of removing time-direction noise can be added to a low-frequency component image of the high-resolution difference image. In the step of performing second addition, an output of the step of performing first addition can be added to the high-resolution image (SR image) so that the high-resolution image corresponding to the received low-resolution image (LR image) is generated.

The step of removing a time-direction noise can involve performing a filtering process using an infinite-duration impulse response (IIR) filter.

According to still another embodiment of the present invention, a computer program for causing an image processing apparatus to generate a high-resolution image is provided. The computer program includes program code for performing the steps of correcting an input image so as to generate a corrected image by using an image correction processing unit and receiving the corrected image and increasing a resolution of the corrected image through super-resolution processing so as to generate a high-resolution image by using a super-resolution processing unit. The step of correcting an input image involves performing at least one of a time-direction noise removal process, a space-direction noise removal process, a compression noise removal process, and an aperture control correction process.

According to the embodiment, the computer program can be provided, using a storage medium and a communication medium having a computer-readable format, to a general-purpose computer system that can execute, for example, various program code. By providing such a computer program in a computer-readable format, processing in accordance with the computer program can be performed in the computer system.

Further features and advantages of the present invention will become apparent from the following detailed description of exemplary embodiments with reference to the attached drawings. In addition, as used herein, the term "system" refers to a logical combination of a plurality of devices; the plurality of devices is not necessarily included in one body.

In the structure according to an embodiment of the present invention, an image processing apparatus generates a high-resolution image having an increased resolution from that of an input image. The image processing apparatus includes an image correction processing unit (PreFilter) that pre-corrects an image input to a super-resolution processing unit that performs processing for increasing the resolution. More specifically, the image processing apparatus analyzes the characteristics of pixels of the input image and performs at least one of time-direction noise removal, space-direction noise removal, compression noise removal, and aperture control correction. The image processing apparatus then inputs the image subjected to these processing operations into a super-resolution processing unit, which performs super-resolution processing on the input image. Using such a structure, generation of a high-quality high-resolution image can be realized.

That is, if super-resolution processing is performed on image data subjected to image quality adjustment, such as contrast control and aperture control (edge enhancement), and image compression, an image having an excessively increased high-frequency range or increased compression noise may be generated, and therefore, the image quality may deteriorate. However, the embodiments of the present invention provide a configuration in which the image correction processing unit (PreFilter) detects the characteristics of the image that decreases the quality of the image and performs image correction and, subsequently, outputs the corrected image to the super-resolution processing unit, which performs super-resolution processing on the image. Accordingly, a high-quality high-resolution image can be generated.

BRIEF DESCRIPTION OF THE DRAWINGS

FIG. 2 is a diagram illustrating an example configuration for performing the super-resolution processing for generating a high-resolution image from a low-resolution image;

FIG. 9 is a diagram illustrating exemplary processing of a time-direction correlation computing unit of an image correction processing unit (PreFilter) of an image processing apparatus according to an embodiment of the present invention;

FIG. 10 is a diagram illustrating exemplary processing of an edge detecting unit of an image correction processing unit (PreFilter) of an image processing apparatus according to an embodiment of the present invention;

FIGS. 11A to 11C are diagrams illustrating exemplary processing of an edge detecting unit of an image correction processing unit (PreFilter) of an image processing apparatus according to an embodiment of the present invention;

FIG. 14 is a diagram illustrating exemplary processing of a filter selecting unit of an image correction processing unit (PreFilter) of an image processing apparatus according to an embodiment of the present invention;

FIGS. 15A and 15B are diagrams illustrating exemplary processing (processing using an aperture control correction filter) of a filtering process executing unit of an image correction processing unit (PreFilter) of an image processing apparatus according to an embodiment of the present invention;

FIGS. 16A and 16B are diagrams illustrating exemplary processing (processing using a compression noise removal filter) of a filtering process executing unit of an image correction processing unit (PreFilter) of an image processing apparatus according to an embodiment of the present invention;

DESCRIPTION OF THE PREFERRED EMBODIMENTS

An image processing apparatus, an image processing method, and a computer program according to an embodiment of the present invention are described in detail below with reference to the accompanying drawings.

According to the present embodiment, an image processing apparatus has a configuration for performing super-resolution processing on image data subjected to image quality adjustment, such as contrast control and aperture control (edge enhancement), and image compression so as to generate a high-resolution image. Note that the image to be processed may be a moving image or a still image. According to the present embodiment, the image processing apparatus performs image correction as pre-processing of the super-resolution processing and, subsequently, performs the super-resolution processing. Thus, the image processing apparatus can generate a high-quality high-resolution image.

Figure 6:
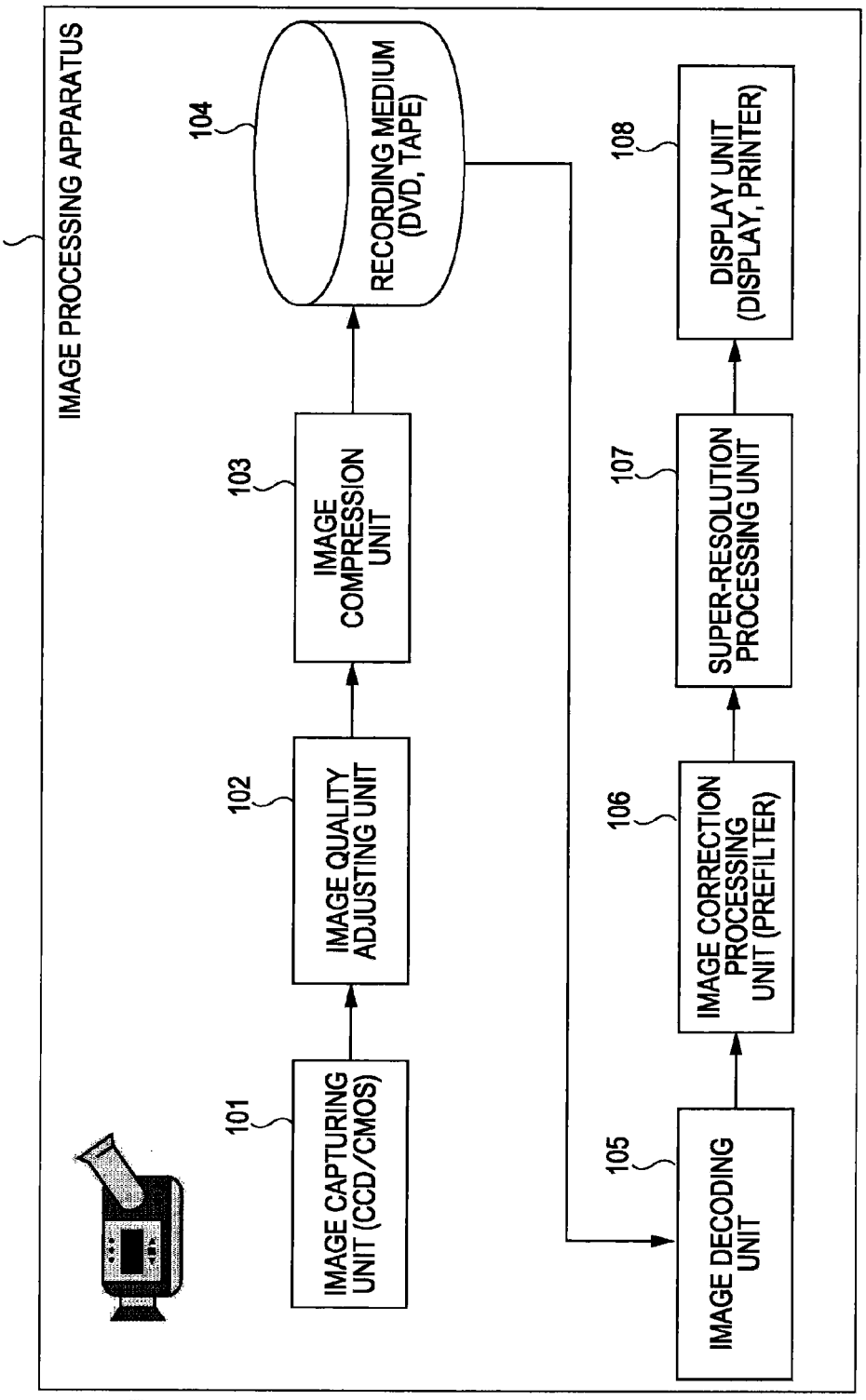
FIG. 6 is a diagram illustrating an example configuration of an image processing apparatus for performing the super-resolution processing according to an embodiment of the present invention.

An exemplary configuration of the image processing apparatus according to the present embodiment is described next with reference to FIGS. 6 and 7. FIG. 6 illustrates the configuration of an image processing apparatus 100, such as a video camera or a still camera. An image capturing unit 101, such as a CCD or CMOS sensor, captures an image. An image quality adjusting unit 102 adjusts the quality of the image captured by an image capturing unit 101 through contrast control and aperture control (edge enhancement). Thereafter, an image compression unit 103 compresses the image using a predetermined compression algorithm, such as MPEG compression. Subsequently, the compressed image is recorded on a recording medium 104, such as a DVD, a magnetic tape, or a flash memory.

Subsequently, super-resolution processing is performed when the image stored on the recording medium 104 is decoded and played back. In an image decoding unit 105, decoding processing is performed on the image recorded on the recording medium 104. Thereafter, in an image correction processing unit (PreFilter) 106, image correction processing is performed. The corrected image is input to a super-resolution processing unit 107. Subsequently, in the super-resolution processing unit 107, super-resolution processing is performed on the corrected image. Thus, a high-resolution image is generated, and the generated high-resolution image is displayed on a display unit 108.

Figure 1A:
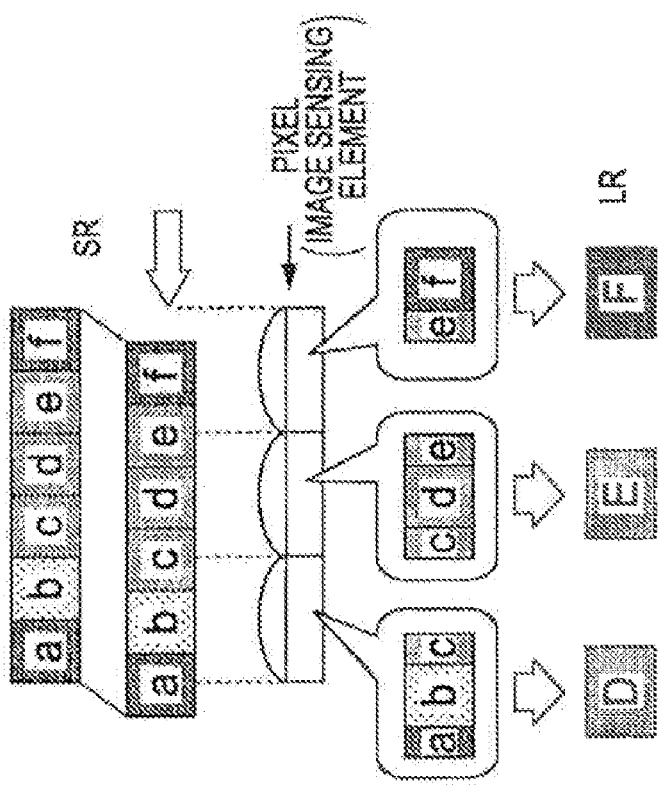
FIGS. 1A and 1B are diagrams illustrating super-resolution processing for generating a high-resolution image from a low-resolution image.
Figure 1B:
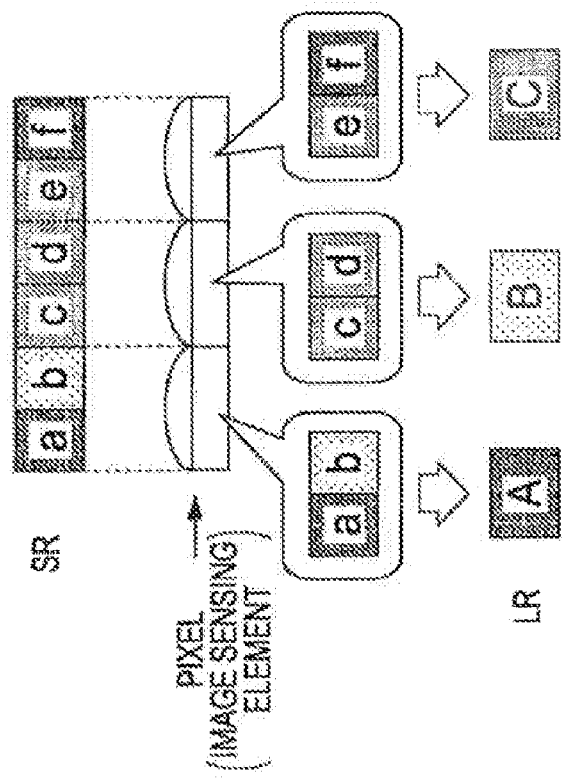
Figure 3:
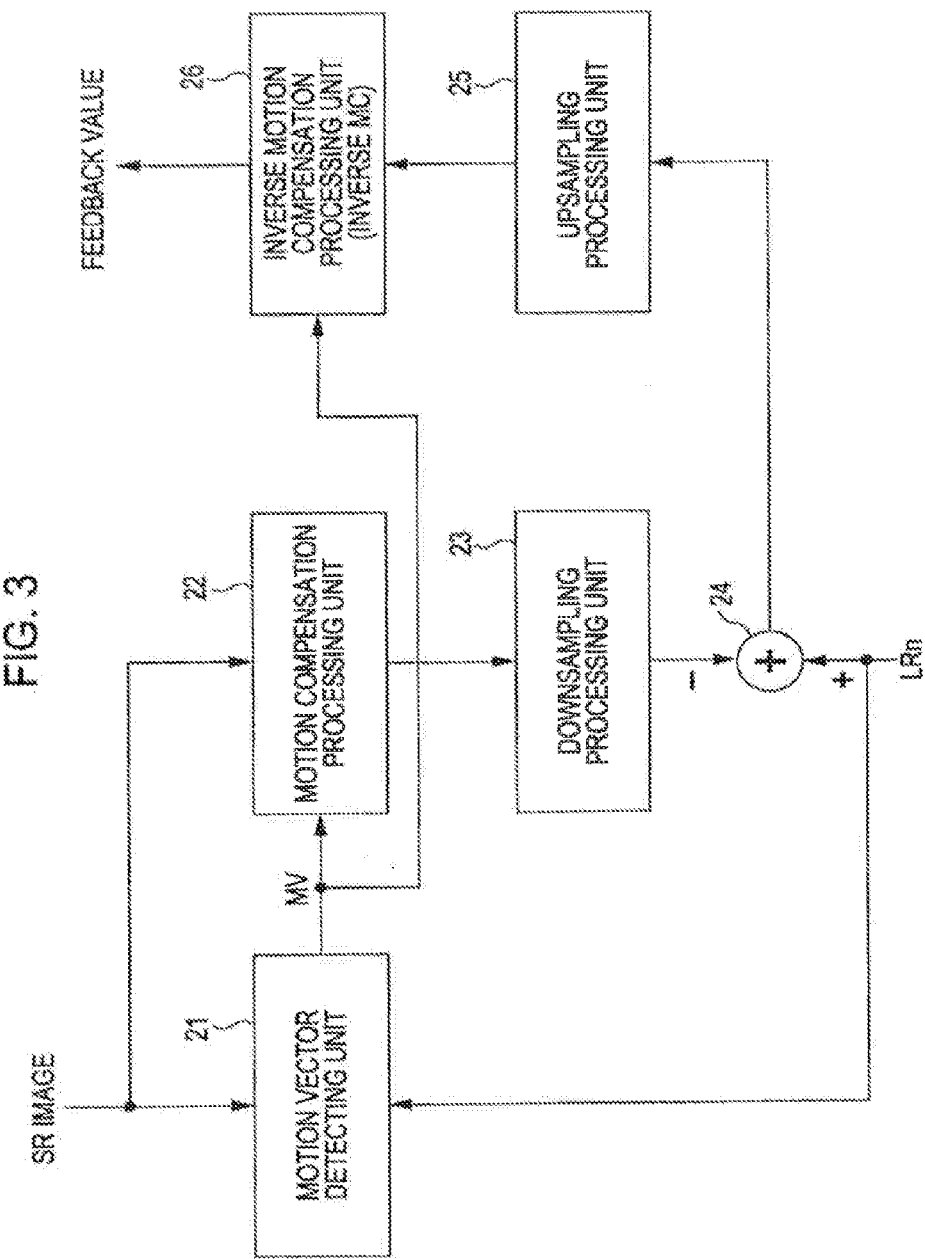
FIG. 3 is a diagram illustrating an example configuration for performing the super-resolution processing for generating a high-resolution image from a low-resolution image.
Figure 4:
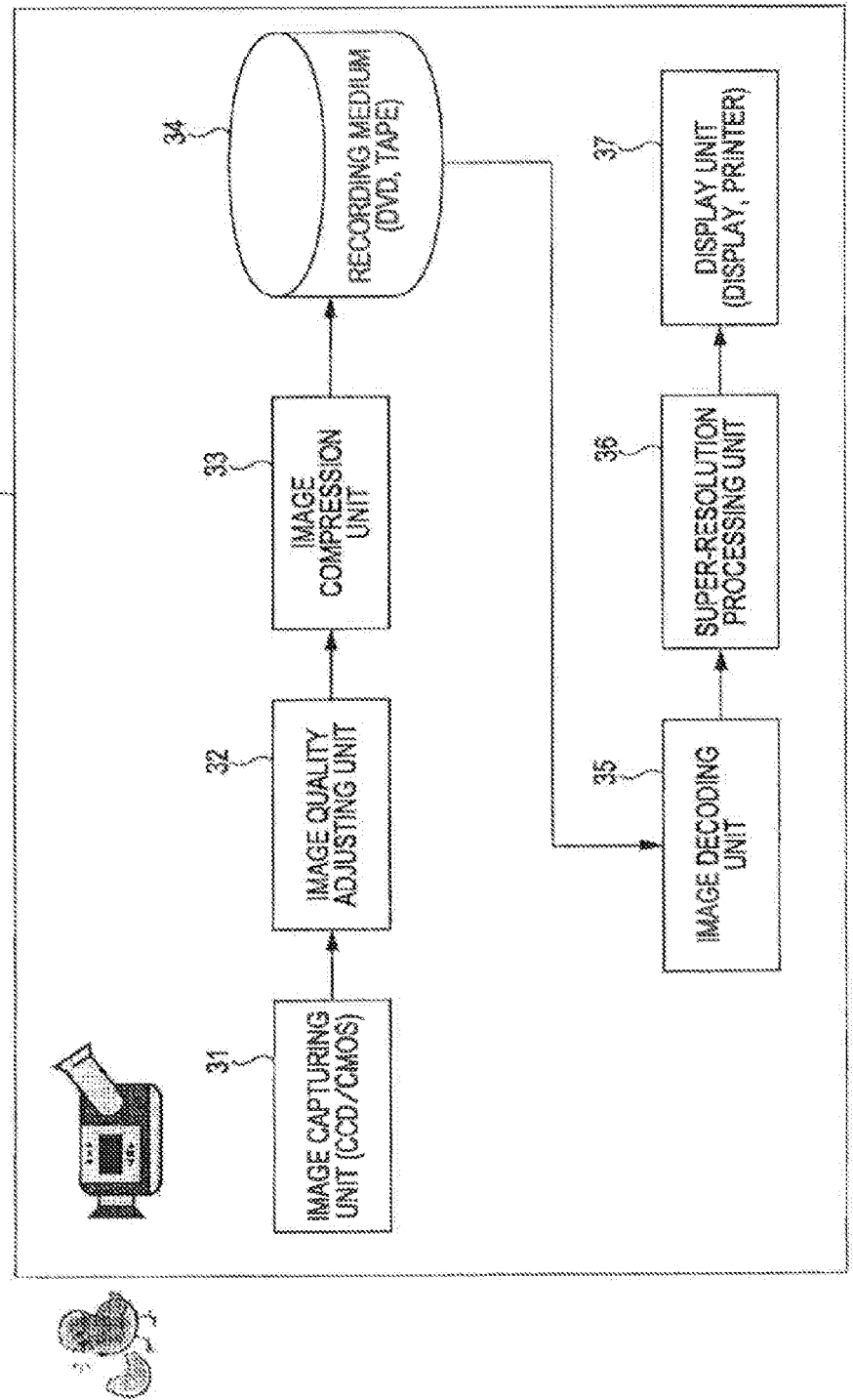
FIG. 4 is a diagram illustrating an example configuration of an image processing apparatus for performing the super-resolution processing.
Figure 5:
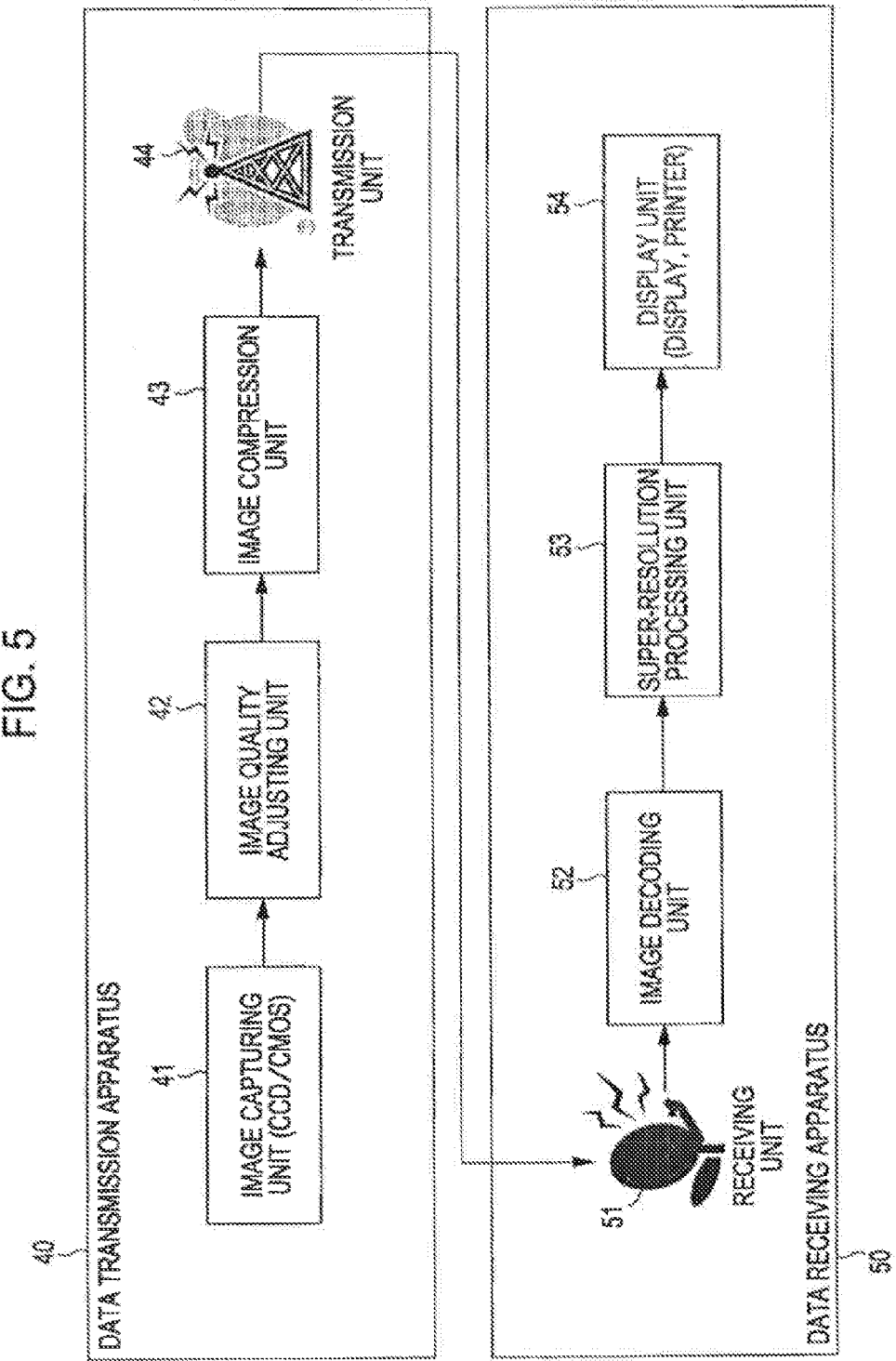
FIG. 5 is a diagram illustrating an example configuration of an image processing apparatus for performing the super-resolution processing.

The configuration shown in FIG. 6 is different from that described above in FIG. 4. The configuration includes the image correction processing unit (PreFilter) 106. That is, in the image processing apparatus according to the present embodiment, the image correction processing unit (PreFilter) 106 performs image correction processing. The corrected image is input to the super-resolution processing unit 107. The super-resolution processing unit 107 then performs super-resolution processing. The operation of the image correction processing unit (PreFilter) 106 is described in more detail below.

While the example shown in FIG. 6 is described with reference to processing performed by, for example, a video camera or a still camera, the processing can be applied to broadcast image data, such as data used for digital broadcast. By performing super-resolution processing on a received image in a receiver, a high-resolution image can be generated and output. For example, in an example configuration shown in FIG. 7, a data transmission apparatus 110 transmits a low-resolution image. An image processing apparatus 120 receives the data transmitted from the data transmission apparatus 110 and performs super-resolution processing on the data so as to generate a high-resolution image and display the high-resolution image.

In the data transmission apparatus 110, an image quality adjusting unit 112 controls the quality of an image captured by an image capturing unit 111, such as a CCD or CMOS sensor, through contrast control and aperture control (edge enhancement). Thereafter, an image compression unit 113 compresses the image using a predetermined compression algorithm, such as MPEG compression. Subsequently, a transmission unit 114 transmits the compressed image.

The data transmitted from the transmission unit 114 is received by a receiving unit 121 of the image processing apparatus 120. An image decoding unit 122 decodes the received data. Subsequently, an image correction processing unit (PreFilter) 123 performs image correction processing. A corrected image is input to a super-resolution processing unit 124. The super-resolution processing unit 124 performs the super-resolution processing so as to generate a high-resolution image. The high-resolution image is then displayed on a display unit 125.

Figure 7:
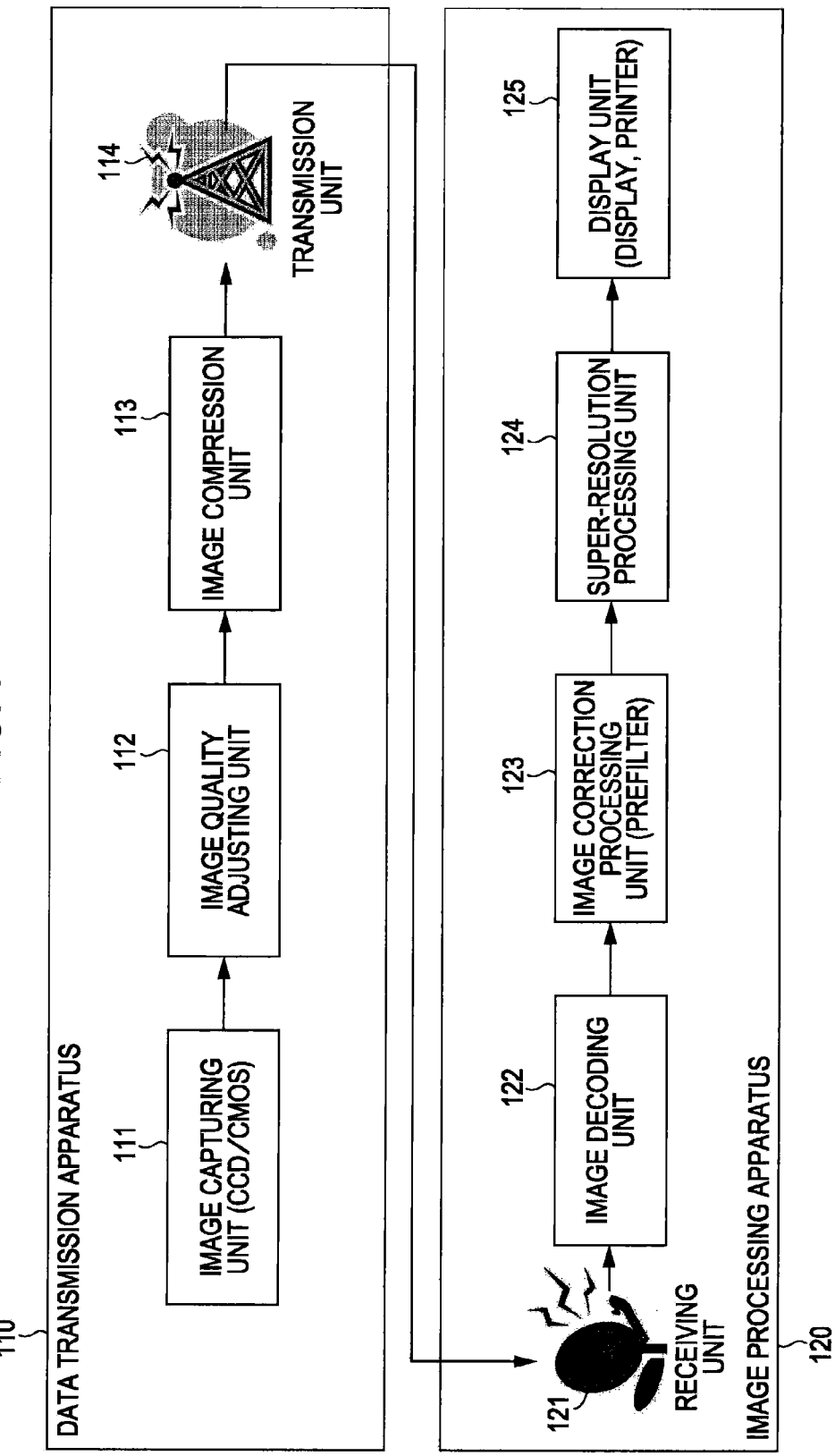
FIG. 7 is a diagram illustrating an example configuration of an image processing apparatus for performing the super-resolution processing according to an embodiment of the present invention.

As shown in FIG. 7, the image processing apparatus 120 includes the image correction processing unit (PreFilter) 123. That is, the image correction processing unit (PreFilter) 123 performs image correction processing. A corrected image is input to the super-resolution processing unit 124, which performs super-resolution processing on the input image.

Figure 8:
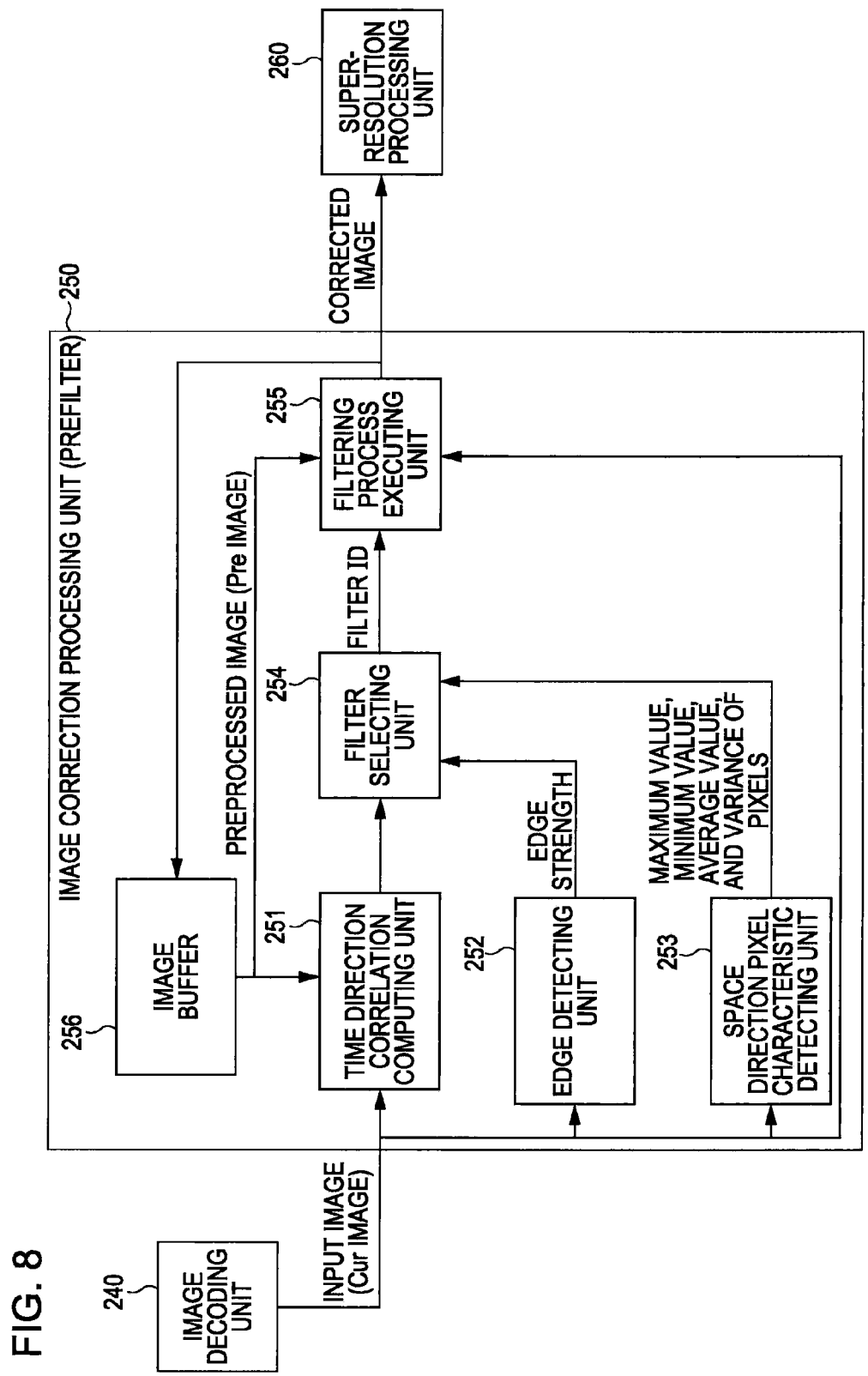
FIG. 8 is a diagram illustrating an example configuration of an image correction processing unit (PreFilter) of an image processing apparatus for performing super-resolution processing according to an embodiment of the present invention.

The detailed configuration and operation of an image correction processing unit (PreFilter) of the image processing apparatus 120 according to the present embodiment are described with reference to FIG. 8 and the subsequent drawings. FIG. 8 is a block diagram illustrating the detailed configuration of the image correction processing unit (PreFilter) of the image processing apparatus 120 according to the present embodiment.

As shown in FIG. 8, an image correction processing unit (PreFilter) 250 receives a decoded image from an image decoding unit 240 and outputs a corrected image to a super-resolution processing unit 260. The image correction processing unit 250 includes a time-direction correlation computing unit 251, an edge detecting unit 252, a space-direction pixel characteristic detecting unit 253, a filter selecting unit 254, a filtering process executing unit 255, and an image buffer 256.

The image correction processing unit 250 sequentially receives decoded images from the image decoding unit 240 and sequentially generates corrected images corresponding to the received images. The image correction processing unit 250 sequentially outputs the corrected images to the super-resolution processing unit 260. For example, in the case of a moving image, temporally successive frames are output. In contrast, in the case of a still image, continuously captured still image frames are output. As used herein, a new frame image input from the image decoding unit 240 is referred to as an "input image (Cur image)". An image that is input before the new frame image is input and is subjected to a filtering process performed by the filtering process executing unit 255 and that is stored in the image buffer 256 is referred to as a "preprocessed image (Pre image)".

First, exemplary processing performed by the image correction processing unit 250 is schematically described. Subsequently, the details of the processing performed by each sub-unit of the image correction processing unit 250 are described. An input image (Cur image) input from the image decoding unit 240 is supplied to the time-direction correlation computing unit 251, the edge detecting unit 252, the space-direction pixel characteristic detecting unit 253, and the filtering process executing unit 255. The image buffer 256 stores a processed image of the previous frame and inputs the image to the time-direction correlation computing unit 251 and the filtering process executing unit 255.

The time-direction correlation computing unit 251 compares the input image (Cur image) with the preprocessed image (Pre image) and outputs a correlation value in the time direction for each of the pixels. For example, the time-direction correlation computing unit 251 computes the covariance value for each block, which is a segmented pixel region the center of which is a given pixel. The time-direction correlation computing unit 251 considers the covariance value as the correlation of the pixel in the time direction and outputs the covariance value to the filter selecting unit 254.

The edge detecting unit 252 computes the edge strength of the input image (Cur image) using, for example, a sobel filter for each of the pixels and outputs the edge strength to the filter selecting unit 254.

The space-direction pixel characteristic detecting unit 253 computes a block feature that indicates the feature of the pixels of each block, which is segmented pixel region the center of which is a certain pixel in the input image (Cur image). The space-direction pixel characteristic detecting unit 253 then outputs the block feature to the filter selecting unit 254. For example, the space-direction pixel characteristic detecting unit 253 outputs, as image features in the space direction, the variance value, a maximum value, and a minimum value of the pixels in the block, the number of pixels having a pixel value greater than or equal to a threshold value, and the number of pixels having a pixel value less than or equal to a threshold value in the block.

The filter selecting unit 254 selects a filter applied to each of the pixels on the basis of the outputs of the time-direction correlation computing unit 251, the edge detecting unit 252, and the space-direction pixel characteristic detecting unit 253. For example, the filter selecting unit 254 selects a filter to be used by the filtering process executing unit 255 by comparing each of the outputs of the time-direction correlation computing unit 251, the edge detecting unit 252, and the space-direction pixel characteristic detecting unit 253 with a corresponding predetermined threshold value. The filter selecting unit 254 then outputs a filter ID serving as filter identification information to the filtering process executing unit 255. Alternatively, by referring to a filter selection table including each of the outputs of the time-direction correlation computing unit 251, the edge detecting unit 252, and the space-direction pixel characteristic detecting unit 253 and its associated filter to be applied, the filter selecting unit 254 may select a filter and output the filter ID of the selected filter to the filtering process executing unit 255.

The filtering process executing unit 255 determines a filter to be applied on the basis of the filter ID, which is serving as filter identification information output from the filter selecting unit 254. The filtering process executing unit 255 further acquires the preprocessed image (Pre image) from the image buffer 256. The filtering process executing unit 255 then performs a filtering process serving as an image correction process on the input image (Cur image) so as to generate a corrected image. Thereafter, the filtering process executing unit 255 outputs the corrected image. The corrected image is input to the super-resolution processing unit 260, which performs super-resolution processing using the corrected image. In addition, the corrected image generated by the filtering process executing unit 255 is input to the image buffer 256 and is stored in the image buffer 256 as a preprocessed image (Pre image) for the next input image (Cur image).

The operation of each of the sub-units is described in more detail below.

Time-Direction Correlation Computing Unit

The operation of the time-direction correlation computing unit 251 is described next with reference to FIG. 9. The time-direction correlation computing unit 251 compares the input image (Cur image) with the preprocessed image (Pre image) so as to output the correlation value in the time direction for each of the pixels. For example, the time-direction correlation computing unit 251 computes the covariance for each block, which is a segmented pixel region the center of which is a given pixel, and considers the covariance value as the correlation of the pixel in the time direction. The time-direction correlation computing unit 251 then outputs the covariance value to the filter selecting unit 254. An example of the operation is described below with reference to FIG. 9. More specifically, the time-direction correlation computing unit 251 performs the following processing steps 1 to 4:

(Step 1)

A pixel of interest and several pixels around the pixel of interest are retrieved from an input image (Cur image) 301. These pixels are retrieved pixels 302 shown in FIG. 9. The number of the retrieved pixels 302 is N.

(Step 2)

From a preprocessed image (Pre image) 311, pixels located at the same positions of the pixels retrieved in step 1 are retrieved. Those are retrieved pixels 312 shown in FIG. 9. The number of the retrieved pixels 312 is N.

(Step 3)

The covariance value is computed on the basis of values of the retrieved pixels 302 and the retrieved pixels 312 retrieved in steps 1 and 2, respectively. The covariance value is computed using the following equation:

$$\text{Covariance} = \frac{1}{N} \sum_i (c_i - \overline{c}_i) \cdot (p_i - \overline{p}_i) \qquad (2)$$

where ci=the pixel value of the pixel of interest in the input image (Cur image)+the pixel values of the surrounding pixels, ci bar (−)=the average value of (the pixel value of the pixel of interest in the input image (Cur image)+the pixel values of the surrounding pixels), Pi=the pixel value of the pixel of interest in the preprocessed image (Pre image)+the pixel values of the surrounding pixels, pi bar (−)=the average value of (the pixel value of the pixel of interest in preprocessed image (Pre image)+the pixel values of the surrounding pixels), and N=the number of pixels used for the computation.

(Step 4)

The computed covariance value is set for the position of the pixel of interest in a covariance image 321.

The time-direction correlation computing unit 251 performs processing described in steps 1 to 4 for every pixel in the input image (Cur image) so as to obtain the covariance value for every pixel and generate the covariance image 321. The time-direction correlation computing unit 251 then outputs the covariance image 321 to the filter selecting unit 254.

Edge Detecting Unit

The edge detecting unit 252 computes the edge strength of the input image (Cur image) for each of the pixels using, for example, a sobel filter and outputs the edge strength to the filter selecting unit 254. A variety of methods for detecting the edge strength of an image has been proposed. In the present embodiment, a detecting method called a "Sobel Filter" is used. However, a method other than the sobel filter method can be used.

As shown in FIG. 10, a vertical-direction edge strength detecting unit 332 detects the edge strength of an input image 331 in the vertical direction. A horizontal-direction edge strength detecting unit 333 detects the edge strength of an input image 331 in the horizontal direction.

For example, the vertical-direction edge strength detecting unit 332 applies a two-dimensional filter shown in FIG. 11A to each of the pixels so as to detect the edge strength in the vertical direction. The horizontal-direction edge strength detecting unit 333 applies a two-dimensional filter shown in FIG. 11B to each of the pixels so as to detect the edge strength in the horizontal direction.

Subsequently, an edge strength summing unit 334 shown in FIG. 10 computes the edge strength on the basis of the edge strength in the vertical direction and the edge strength in the horizontal direction. As shown in FIG. 11C, the edge strength G can be computed using the following equation:

$$G = \sqrt{G_h^2 + G_v^2} \qquad (3)$$

where

G=the edge strength, $G_h$=the edge strength in the horizontal direction, and $G_v$=the edge strength in the vertical direction.

Through the above-described processing, the edge strength for each of the pixels of the input image (Cur image) can be computed, and an output 335 representing the edge strength for each of the pixels is output to the filter selecting unit 254.

Space-Direction Pixel Feature Detecting Unit

The space-direction pixel characteristic detecting unit 253 computes the block feature representing the feature of the pixels of each block, which is a segmented pixel region the center of which is a given pixel. The space-direction pixel characteristic detecting unit 253 then outputs the block feature to the filter selecting unit 254. For example, the space-direction pixel characteristic detecting unit 253 outputs the variance value, the maximum value, and the minimum value of the pixels in a block, the number of pixels having a value greater than or equal to a threshold value, and the number of pixels having a value less than or equal to a threshold value in the block. The operation of the space-direction pixel characteristic detecting unit 253 is described next with reference to FIG. 12.

The space-direction pixel characteristic detecting unit 253 detects the following features (a) to (f) (the feature detecting operation is performed for each of the pixels, and the number of each of the following output values is the same as the number of input pixels):

(a) the maximum pixel value in a pixel region 343 including a pixel of interest 342 selected from an input image 341;

(b) the minimum pixel value in the pixel region 343 including the pixel of interest 342 selected from the input image 341;

(c) the variance value of the pixel region 343 including the pixel of interest 342 selected from the input image 341;

(d) the average value of the pixel region 343 including the pixel of interest 342 selected from the input image 341;

(e) the number of pixels having a value greater than or equal to a predetermined threshold value in a pixel region 344 including the pixel of interest 342 selected from the input image 341 (the number of high-luminance pixels); and (f) the number of pixels having a value less than or equal to a predetermined threshold value in the pixel region 344 including the pixel of interest 342 selected from the input image 341 (the number of low-luminance pixels).

Figure 12:
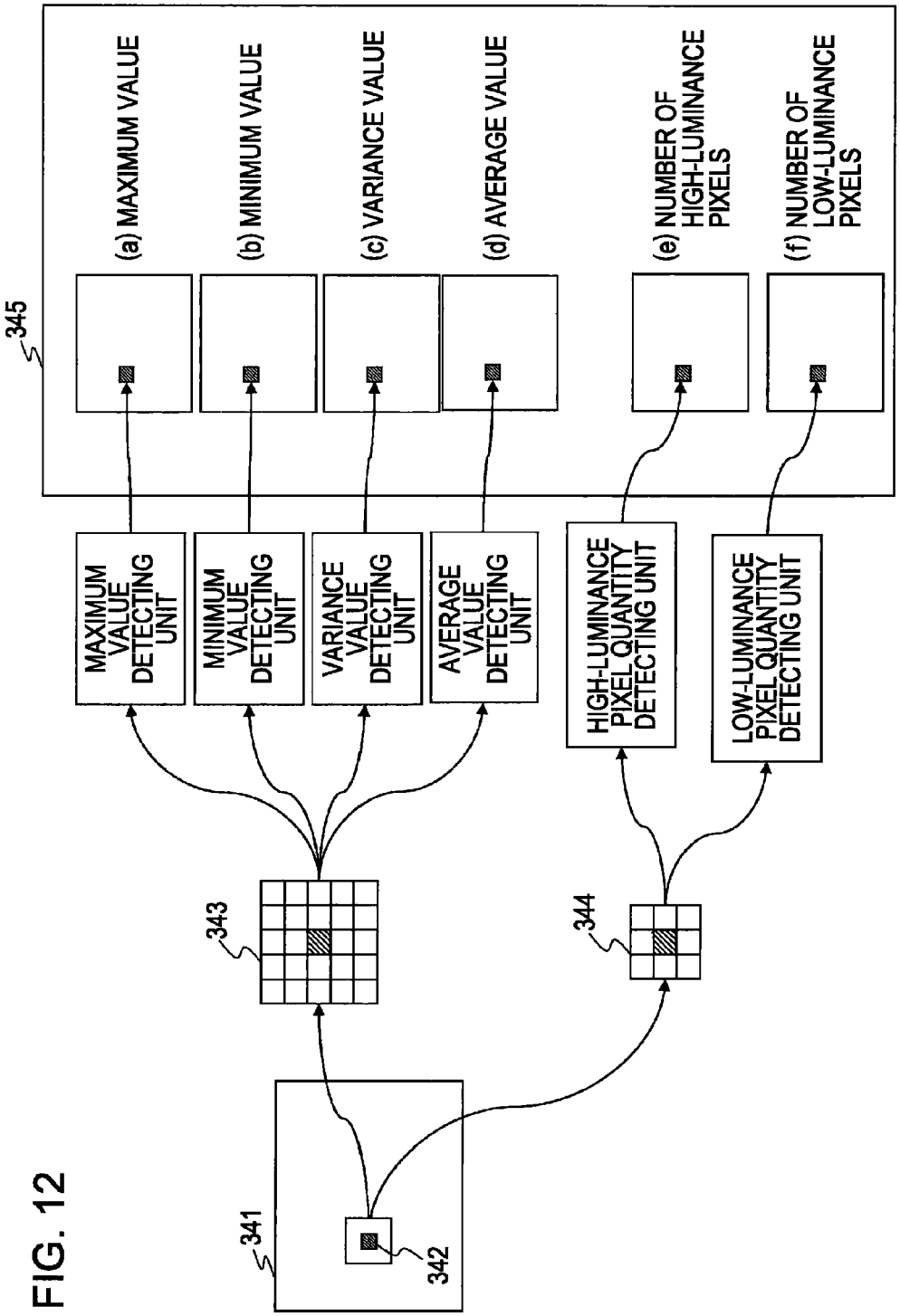
FIG. 12 is a diagram illustrating exemplary processing of a space-direction pixel characteristic detecting unit of an image correction processing unit (PreFilter) of an image processing apparatus according to an embodiment of the present invention.

In the example shown in FIG. 12, the pixel region from which the maximum value, the minimum value, the average value, and the variance value are detected is the pixel region 343 including the pixel of interest 342 and having a size of 5×5. In contrast, the pixel region from which the number of high-luminance pixels and the number of low-luminance pixels are detected is a pixel region 344 including the pixel of interest 342 and having a size of 3×3. However, the pixel regions are not limited thereto. A variety of region settings can be employed.

The following values computed in the above-described manner are output to the filter selecting unit 254 as an output 345: (a) the maximum pixel value, (b) the minimum pixel value, (c) the variance value, (d) the average value, (e) the number of high-luminance pixels, and (f) the number of low-luminance pixels. The space-direction pixel characteristic detecting unit 253 need not output all of the data items (a) to (f). The space-direction pixel characteristic detecting unit 253 may detect some of the data items as the image features in the space direction and output the data items to the filter selecting unit 254.

Filter Selecting Unit

The filter selecting unit 254 selects a filter to be applied to each pixel on the basis of the outputs of the time-direction correlation computing unit 251, the edge detecting unit 252, and the space-direction pixel characteristic detecting unit 253. For example, by comparing output information from each of the time-direction correlation computing unit 251, the edge detecting unit 252, and the space-direction pixel characteristic detecting unit 253 with a predetermined threshold value, the space-direction pixel characteristic detecting unit 253 determines a filter to be used by the filtering process executing unit 255. The space-direction pixel characteristic detecting unit 253 then outputs the filter ID serving as filter identification information to the filtering process executing unit 255.

Figure 13:
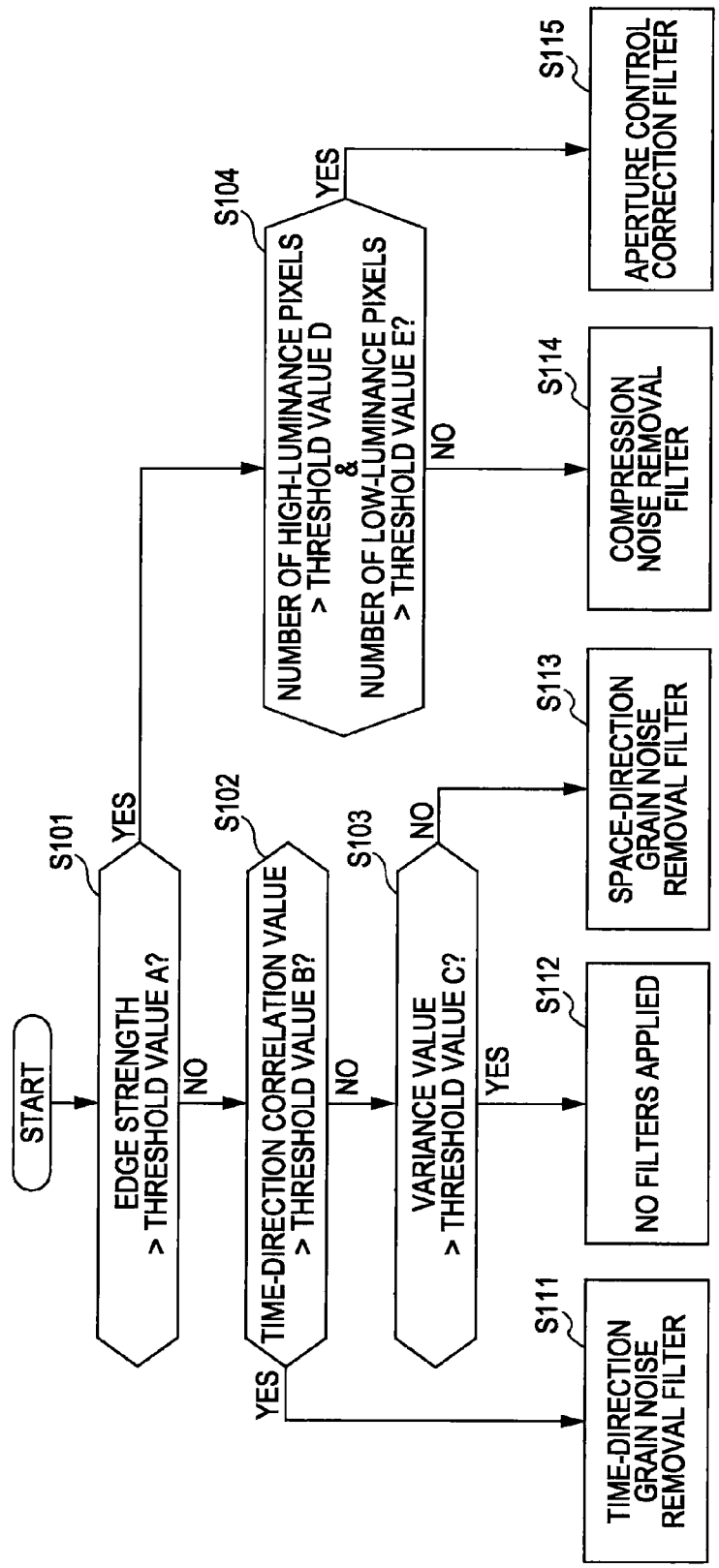
FIG. 13 is a flow chart illustrating a processing sequence of a filter selecting unit of an image correction processing unit (PreFilter) of an image processing apparatus according to an embodiment of the present invention.

An exemplary process flow performed by the filter selecting unit 254 is described next with reference to the flow chart shown in FIG. 13. The processes indicated by the flow chart shown in FIG. 13 are performed for each of the pixels of the input image (Cur image) input to the image correction processing unit (PreFilter) 250 shown in FIG. 8. The filter selecting unit 254 determines a filter used in the filtering process executing unit 255 for each of the pixels.

In step S101, the edge strength of a pixel to be processed of the input image (Cur image) input from the edge detecting unit 252 is compared with a predetermined threshold value A. If the condition: the edge strength>the predetermined threshold value A is satisfied, the processing proceeds to step S104. If the condition is not satisfied, the processing proceeds to step S102.

In step S102, the correlation value of the processed pixel of the input image (Cur image) input from the time-direction correlation computing unit 251 in the time direction is compared with a predetermined threshold value B. If the condition: the correlation value in the time direction>the predetermined threshold value B is satisfied, the processing proceeds to step S111. If the condition is not satisfied, the processing proceeds to step S103.

In step S103, the variance value computed for the processed pixel of the input image (Cur image) input from the space-direction pixel characteristic detecting unit 253 is compared with a predetermined threshold value C. If the condition: the variance value>the predetermined threshold value C is satisfied, the processing proceeds to step S113. If the condition is not satisfied, the processing proceeds to step S112.

Furthermore, in step S104, the number of high-luminance pixels and the number of low-luminance pixels computed for the processed pixel of the input image (Cur image) input from the space-direction pixel characteristic detecting unit 253 are compared with predetermined threshold value D and predetermined threshold value E, respectively. If the conditions:

the number of high-luminance pixels>the predetermined threshold value C, and the number of low-luminance pixels>the predetermined threshold value E are satisfied, the processing proceeds to step S115. If the conditions are not satisfied, the processing proceeds to step S114.

In step S104 of the processing flow, the number of high-luminance pixels and the number of low-luminance pixels computed for the processed pixel of the input image (Cur image) input from the space-direction pixel characteristic detecting unit 253 are compared with predetermined threshold value D and predetermined threshold value E, respectively. However, in place of the number of high-luminance pixels and the number of low-luminance pixels, the following conditions may be used for the determination:

the maximum pixel value>the predetermined threshold value F, and the minimum pixel value<the predetermined threshold value G.

If these conditions are satisfied, the processing proceeds to step S115. If the conditions are not satisfied, the processing proceeds to step S114.

Through the above-described determination process, a filer to be applied to the pixel to be processed of the input image (Cur image) in the processing performed by the filtering process executing unit 255 can be determined. That is, one of the following filters (a) to (e) is selected:

(a) a grain noise removal filter in the time direction applied in step S111;

(b) no filters applied in step S112;

(c) a grain noise removal filter in the space direction applied in step S113;

(d) a compression noise removal filter applied in step S114; and (e) an aperture control correction filter applied in step S115.

These determination processes are summarized in the table shown in FIG. 14. The filter selecting unit 254 can select a filter by using the outputs of the time-direction correlation computing unit 251, the edge detecting unit 252, and the space-direction pixel characteristic detecting unit 253 and by referencing a filter selection table indicating an applied filter as shown in FIG. 14. The filter selecting unit 254 can then output a filter ID serving as applied filter identification information to the filtering process executing unit 255.

In this way, the filter selecting unit 254 determines a filter to be applied for each of the pixels of the input image. More specifically, it is determined whether the edge strength is greater than a predetermined value. If the edge strength is greater than the predetermined value, it is further determined whether each of the number of high-luminance pixels and the number of low-luminance pixels is greater than a predetermined value. If each of the number of high-luminance pixels and the number of low-luminance pixels is greater than a predetermined value, the filter selecting unit 254 determines that the previously applied enhancement of aperture control was excessive, and therefore, determines that processing using an aperture control correction filter suitable for correction is to be performed (S115).

However, if each of the number of high-luminance pixels and the number of low-luminance pixels is less than or equal to the predetermined value, the filter selecting unit 254 determines that compression distortion caused by compression, such as MPEG or JPEG compression, is noticeable, and therefore, determines that processing using a compression noise removal filter suitable for correction is to be performed (S114).

If the edge strength is less than or equal to the threshold value, the filter selecting unit 254 determines that grain noise occurring when the image is captured is more noticeable than the edge component of the image, and therefore, the filter selecting unit 254 performs correction processing for the grain noise. As shown by the flow chart in FIG. 13, in this processing, it is further determined whether the correlation value in the time direction is high. If the correlation value (the covariance) in the time direction is higher than the threshold value, the filter selecting unit 254 determines that processing using a filter in the time direction is to be performed (S111).

However, if the correlation value (the covariance) in the time direction is low, the filter selecting unit 254 determines whether or not a filter is applied using a variance value of the pixels in the vicinity of the pixel of interest. That is, if the variance value is high, a negative impact of application of the filter in the space direction may appear. Therefore, the filter selecting unit 254 determines that no filters are to be applied (S112). However, if the variance value is less than a predetermined value, the filter selecting unit 254 determines that processing using a filter in the space direction is to be performed (S113).

In this way, filter information is determined. The filter information is output to the filtering process executing unit 255, which performs image correction processing using the selected filter.

Filtering Process Executing Unit

The filtering process executing unit 255 determines a filter to be applied using the filter ID serving as filter identification information output from the filter selecting unit 254. In addition, the filtering process executing unit 255 receives the preprocessed image (Pre image) from the image buffer 256. The filtering process executing unit 255 then performs a filtering process for correcting the input image (Cur image) so as to generate a corrected image and output the corrected image. The output image is input to the super-resolution processing unit 260. The super-resolution processing unit 260 performs super-resolution processing using the corrected image. Note that the corrected image generated by the filtering process executing unit 255 is input to the image buffer 256. The corrected image is stored in the image buffer 256 so as to serve as a preprocessed image (Pre image) for the next input image (Cur image).

A variety of filtering operations performed by the filtering process executing unit 255 are described below.

Aperture Control Correction Filter

If the edge strength is greater than a predetermined value, and each of the number of high-luminance pixels and the number of low-luminance pixels is greater than a predetermined value, it is determined that the enhancement of aperture control was excessive, and therefore, the filtering process executing unit 255 performs processing using an aperture control correction filter suitable for correction.

The processing using an aperture control correction filter is described next with reference to FIGS. 15A and 15B. As shown in FIG. 15A, the filtering process executing unit 255 selects a pixel 401 to be processed and a reference pixel region 402 including the pixel 401 and pixels that surround the pixel 401. In this example, the size of the reference pixel region 402 is 5×5.

As shown in FIG. 15B, processing performed in steps S211 to S213 is the processing using the aperture control correction filter.

In step S211, a pixel that does not satisfy the high- or low-luminance condition is removed from pixels surrounding the pixel 401 within a predetermined area in the reference pixel region. For example, determination is made using the condition: low-luminance threshold value<pixel value<high-luminance threshold value. Thus, a pixel that does not satisfy the condition is removed.

In step S212, the median value of the pixels remaining in the reference pixel region is computed. Note that the maximum value, the minimum value, or the average value may be used in place of the median value.

In step S213, the pixel value of the pixel to be processed is replaced with the computed median value.

As described above, the processing using the aperture control correction filter is performed as, for example, processing in which a pixel value is selected and replaced with another pixel value using a median filter (the median value).

Compression Noise Removal Filter

If each of the number of high-luminance pixels and the number of low-luminance pixels is less than or equal to a predetermined value, it is determined that compression distortion caused by compression, such as MPEG or JPEG compression, is noticeable, and therefore, the filtering process executing unit 255 performs correction processing using a compression noise removal filter suitable for the correction.

The processing using the compression noise removal filter is described next with reference to FIGS. 16A and 16B. In the compression noise removal filter, noise occurring at the DCT block boundary, such as that of a deblocking filter used in some compression algorithms including MPEG-4 or H.264, is reduced.

In general, in deblocking processing, filter selection is performed using information about pixels at a block boundary subjected to DCT processing and, subsequently, smoothing operation is performed. In addition, since block noise caused by the DCT processing is generated only at the DCT boundary, the deblocking processing is applied to the area near the DCT block boundary.

For example, processing for reducing block noise between pixels a0 and b0, as shown in FIG. 16A, is described. In this case, in order to reduce the block noise, the pixel features in the horizontal direction, as shown by arrow 411 in FIG. 16B, are detected, and smoothing processing is performed. For example, in the case of MPEG-4, smoothing operation using a smoothing filter is performed using 10 pixels surrounding the pixels a0 and b0 (pixels a4 to a0 and pixels b0 to b4), as shown in FIG. 16B.

An example smoothing algorithm used for a smoothing filter is expressed as follows:

$$eq\_cnt = f(a4-a3) + f(a3-a2) + f(a2-a1) + f(a1-a0) + f(a0-b0) + f(b0-b1) + f(b1-b2) + f(b2-b3) + f(b3-b4),$$

where $f(\gamma) = 1$ if $|\gamma| \leq THR1$ and 0 otherwise.

If (eq_cnt ≥ THR2)

DC offset mode is applied.

else

Default mode is applied.

In this algorithm, a DC offset mode is selected when pixels a0 to a4 and pixels b0 to b4 shown in FIG. 16B are configured to form a flat image. Accordingly, when a DC offset mode is selected, a strong smoothing filter is applied to the pixel.

In contrast, when a default mode is selected, it is determined that pixels are configured to form a complex image. Therefore, week smoothing operation is performed. In this way, an adverse effect caused by the smoothing operation can be prevented.

As described above, the compression noise removal filter reduces noise at the DCT block boundary, such as that of a deblocking filter used in the algorithm, such as MPEG-4 or H.264.

Time Direction Grain Removal Filter

If the edge strength is less than or equal to the threshold value, it is determined that grain noise occurring when the image is captured is more noticeable than the edge component of the image, and therefore, correction processing for the grain noise is performed. As shown by the flow chart in FIG. 13, if the correlation value (the covariance) in the time direction is greater than the threshold value, the filtering process executing unit 255 performs processing using a filter in the time direction.

The processing using a time-direction grain noise removal filter is described next with reference to FIG. 17. In the processing using a time-direction grain noise removal filter, a lowpass filter is applied in the time direction so as to remove grain noise.

Figure 17:
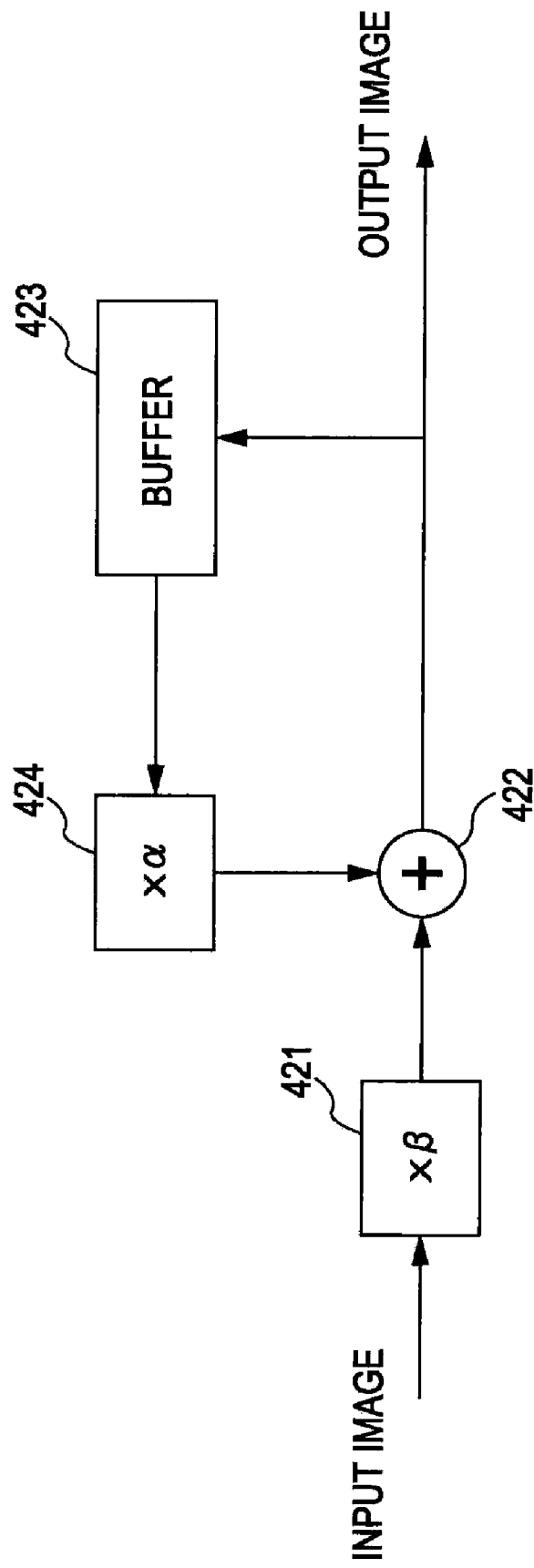
FIG. 17 is a diagram illustrating exemplary processing (processing using a compression noise removal filter) of a filtering process executing unit of an image correction processing unit (PreFilter) of an image processing apparatus according to an embodiment of the present invention.

For example, in the configuration shown in FIG. 17, an infinite-duration impulse response (IIR) filter is applied in the time direction in order to remove grain noise. If the currently processed frame is the first frame, no operations are performed, and the result is output. In addition, the output result is stored in a buffer 423.

An pixel value correcting unit 421 multiples the pixel value of each of pixels of the input image by a coefficient β, and outputs the result to an adder 422 disposed downstream of the pixel value correcting unit 421. Each of the pixel values of the pixels in the processing result for the previous frame stored in the buffer 423 is multiplied by a coefficient α by a pixel value correcting unit 424 and is input to the adder 422. The adder 422 sums these resultant values and generates an image. The adder 422 then outputs the image. The summation is externally output in the form of an output image. At the same time, the output image is stored in the buffer and is used for processing of the next frame.

For example, the coefficients used in the pixel value correcting unit 421 and the pixel value correcting unit 424 are determined as follows:

$\alpha = 1 - \gamma$, and $\beta = \gamma$ $(0 \leq \gamma \leq 1)$

As described above, in the processing using a time direction grain removal filter, a lowpass filter is applied in the time direction so as to remove grain noise.

Space Direction Grain Noise Removal Filter

As shown by the flow diagram in FIG. 13, if the edge strength is less than or equal to the threshold value and the correlation in the time direction is low, it is determined whether a filter is applied or not using a variance value of a pixel of interest with respect to the surrounding pixels. That is, if the variance is high, a negative impact of application of the filter in the space direction may appear. Therefore, a filter is not applied. However, if the variance value is less than or equal to a predetermined value, the filtering process executing unit 255 performs processing using a filter in the space direction.

In the processing using a space direction grain removal filter, the features of an image in the space direction are referenced, and a noise removal filter is applied.

In order to remove noise using the pixel features in the space direction, a variety of methods have been proposed. Here, one of these methods can be used. Examples of these methods include:

processing in which a lowpass filter is applied in the space direction, processing in which a median filter is applied in the space direction, processing in which the flatness is detected and the filter strength is changed, processing in which the edge region is detected and the filter strength is changed, and processing in which an image is wavelet-transformed and is divided for each of the frequency components so as to remove noise.

The filtering process executing unit 255 can perform one of the above-described processing methods.

The filter selecting unit 254 of the filtering process executing unit 255 employs the filter determined through the processing flow shown in FIG. 13 and performs the above-described processing. The filter selecting unit 254 then outputs the processing result to the super-resolution processing unit 260, as shown in FIG. 8. The super-resolution processing unit 260 performs super-resolution processing on the corrected image subjected to the filtering process performed by the filtering process executing unit 255 of the image correction processing unit 250.

Super-Resolution Processing Unit

An exemplary configuration and operation of the super-resolution processing unit of the image processing apparatus according to the present embodiment are described in detail next with reference to FIG. 18.

Figure 18:
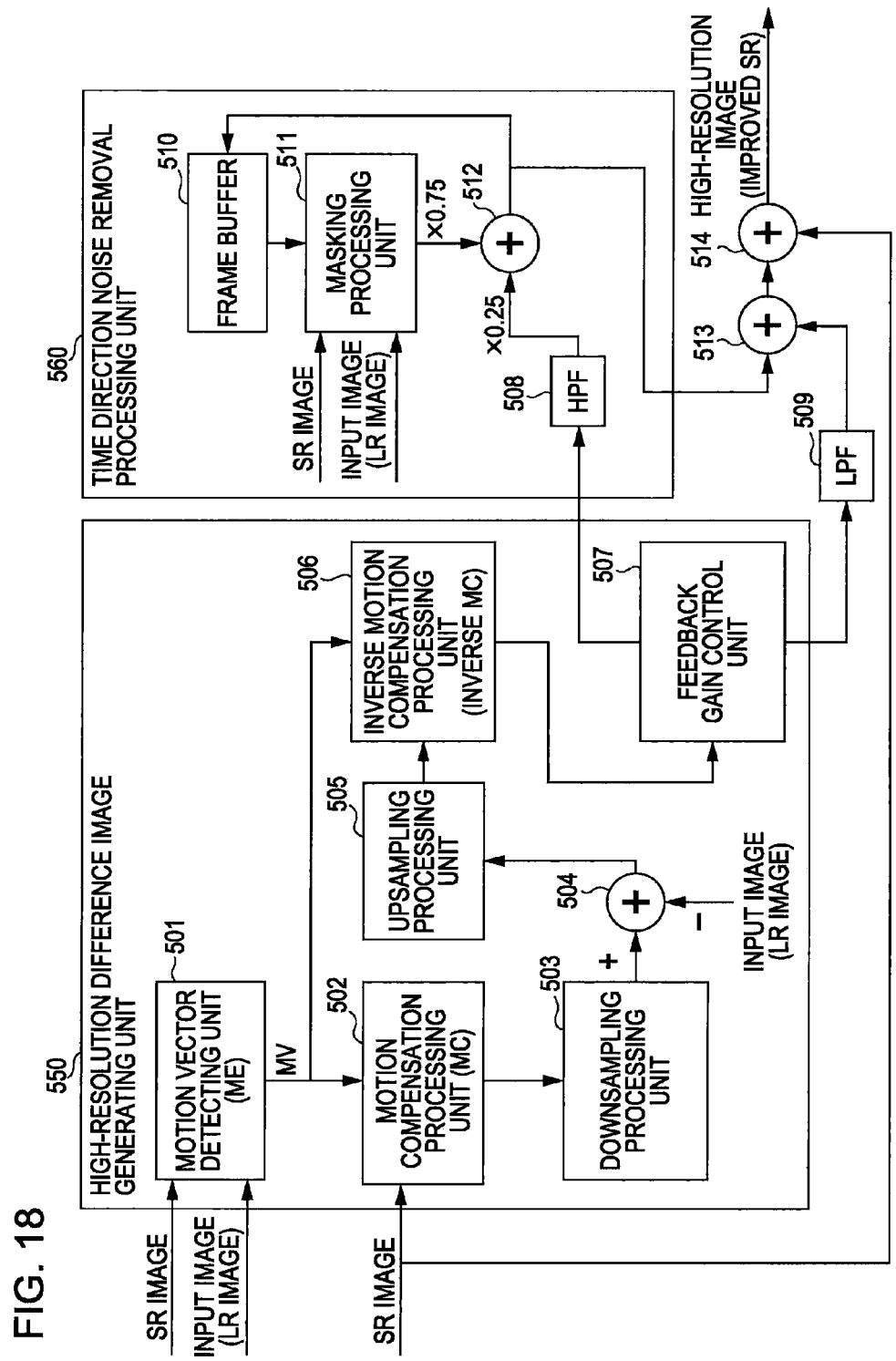
FIG. 18 is a diagram illustrating a detailed example configuration of a super-resolution processing unit of an image processing apparatus according to an embodiment of the present invention.

As shown in FIG. 18, the super-resolution processing unit includes a high-resolution difference image generating unit 550 and a time direction noise removal processing unit 560. The super-resolution processing unit receives the input image (LR image), which is a corrected image obtained through a filtering process performed by the filtering process executing unit 255 of the image correction processing unit 250. The super-resolution processing unit further receives, from an SR image buffer (not shown), the SR image generated through immediately previously performed super-resolution processing. Note that the LR image is a low-resolution image, and the SR image is a high-resolution image. Also, note that, when the processing has just started and no SR image frames have been generated, an input image (LR image) LR0, which is an initial input image, is upsampled into an image having a resolution the same as that of the SR image. The upsampled image is then stored in the SR image buffer and is supplied.

The SR image is input to a motion vector detecting unit (ME) 501, a motion compensation processing unit 502, a masking processing unit 511, and an adder circuit 514. In contrast, the input image (LR image), which is a corrected image obtained through a filtering process performed by the filtering process executing unit 255 of the image correction processing unit 250, is input to the motion vector detecting unit (ME) 501, an adder circuit 504, and the masking processing unit 511.

An exemplary operation of the high-resolution difference image generating unit 550 shown in FIG. 18 is described next. The motion vector detecting unit (ME) 501 detects a motion vector based on the SR image using the input SR image and the LR image. The motion vector detecting unit (ME) 501 then outputs the detected motion vector (MV) to the motion compensation processing unit 502 and an inverse motion compensation processing unit 506.

The motion compensation processing unit 502 performs motion compensation on the SR image on the basis of the motion vector (MV) supplied from the motion vector detecting unit 501. The motion compensation processing unit 502 then outputs the image obtained through the motion compensation to a downsampling processing unit 503. The position of the object captured in the SR image obtained through the motion compensation is corrected so as to be close to the position of the object captured in the input image (LR image).

The downsampling processing unit 503 downsamples the motion-compensated SR image supplied from the motion compensation processing unit 502 so as to convert the SR image into a low-resolution image having a resolution the same as that of the LR image. The downsampling processing unit 503 then outputs the converted image to the adder circuit 504. The operation for obtaining a motion vector from an SR image and an input image (LR image) and converting an image motion-compensated using the obtained motion vector into an image having a resolution the same as that of the LR image corresponds to a simulation of a captured image on the basis of the SR image.

The adder circuit 504 generates a difference image indicating the difference between the input image (LR image) and the image obtained by downsampling the SR image. The adder circuit 504 then outputs the generated difference image to an upsampling processing unit 505.

The upsampling processing unit 505 upsamples the difference image supplied from the adder circuit 504 so as to generate an image having a resolution the same as that of the SR image. The upsampling processing unit 505 then outputs the generated image to the inverse motion compensation processing unit 506.

Using the motion vector (MV) supplied from the motion vector detecting unit 501, the inverse motion compensation processing unit 506 inverse motion-compensates the high-resolution difference image upsampled so as to have a resolution the same as that of the SR image and supplied from the upsampling processing unit 505. The inverse motion compensation processing unit 506 then outputs the difference image to a feedback gain control unit 507.

The feedback gain control unit 507 receives, from the inverse motion compensation processing unit 506, an image obtained by inverse motion-compensating the image upsampled from the difference image between the input image (LR image) and the SR image in the form of a feedback value. The feedback gain control unit 507 adjusts the gain of the difference image inverse motion-compensated and supplied from the inverse motion compensation processing unit 506. The feedback gain control unit 507 then outputs the gain-adjusted image to a highpass filter (HPF) 508 and a lowpass filter (LPF) 509.

For example, the feedback gain control unit 507 adjusts the gain by multiplying all of the frequency components of an image signal of the SR image indicated by the feedback value supplied from the inverse motion compensation processing unit 506 by a certain value. Alternatively, the feedback gain control unit 507 may adjust the gain by multiplying the different frequency components by different values.

In addition, when increasing the gain and adding the gain to the SR image, the feedback gain control unit 507 may decrease the gain for a signal of a frequency component that is likely to have a negative impact to the image. In order to determine whether a signal has a negative impact to the image, the amount of noise contained in the feedback value supplied from the inverse motion compensation processing unit 506 and the reliability of a motion vector, such as an SAD (sum of absolute differences), obtained when the motion vector is detected can be used. Furthermore, the gain adjustment processing may be performed on the entirety of the image or just a region of the image.

The highpass filter (HPF) 508 of the time direction noise removal processing unit 560 performs HPF processing in which a low-frequency component is removed from the output of the feedback gain control unit 507 and performs IIR filtering (Infinite-duration Impulse Response filtering) using an adder circuit 512, a frame buffer 510, and the masking processing unit 511. While the present embodiment has been described with reference to an IIR filtering structure using the adder circuit 512, the frame buffer 510, and the masking processing unit 511, the present invention is not limited to an IIR filter. For example, any time-direction noise removal filter (such as a finite-duration impulse response (FIR) filter) that performs lowpass filtering in the time direction so as to blur an image in the time direction can be employed.

The masking processing unit 511 receives the SR image and the input image (LR image). The masking processing unit 511 then detects a moving object from difference data between the SR image and the input image (LR image), and performs masking in order to stop a noise removal operation in the time direction (an IIR filter application operation) performed on a moving object region.

The output of the highpass filter (HPF) 508 and the output of the masking processing unit 511 are summed, for example, in proportions of 0.25:0.75 in the adder circuit 512. The result is output to a next adder circuit 513. Note that the summation ratio between the output of the highpass filter (HPF) 508 and the output of the masking processing unit 511 is only an example. Any other ratio can be used.

The adder circuit 513 sums the image obtained by performing time-direction noise removal on the low-frequency component removed difference image and the difference image formed from a low-frequency component obtained from the image sent from the feedback gain control unit 507 and passed through the lowpass filter (LPF) 509. The summed image is further output to the adder circuit 514.

The adder circuit 514 sums the difference image input from the adder circuit 513 and the SR image generated in the immediately previous processing so as to generate a new high-resolution image (SR image) and output the SR image. In addition, this SR image is stored in the SR buffer for use in the next round of super-resolution processing.

The above-described processing is performed by the super-resolution processing unit in the image processing apparatus according to the present embodiment. In the configuration according to the present embodiment, as described in FIGS. 8 to 17, the input image (LR image) input to the super-resolution processing unit is an image corrected by the image correction processing unit (the PreFilter). By performing super-resolution processing using the corrected image, a high-quality high-resolution image can be generated.

That is, if super-resolution processing is performed by decompressing an image that is quality-adjusted (e.g., an image subjected to contrast adjustment and aperture control (edge enhancement)) and compressed, an image having an excessively enhanced high-frequency range or increased compression noise is generated, and therefore, the image quality may deteriorate. However, in the configuration according to the present embodiment, the image correction processing unit (the PreFilter) detects the features of the image that decrease the image quality, performs image correction in advance, and outputs the corrected image to the super-resolution processing unit. Subsequently, the super-resolution processing unit performs super-resolution processing. Therefore, a high-quality high-resolution image can be generated.

Figure 19:
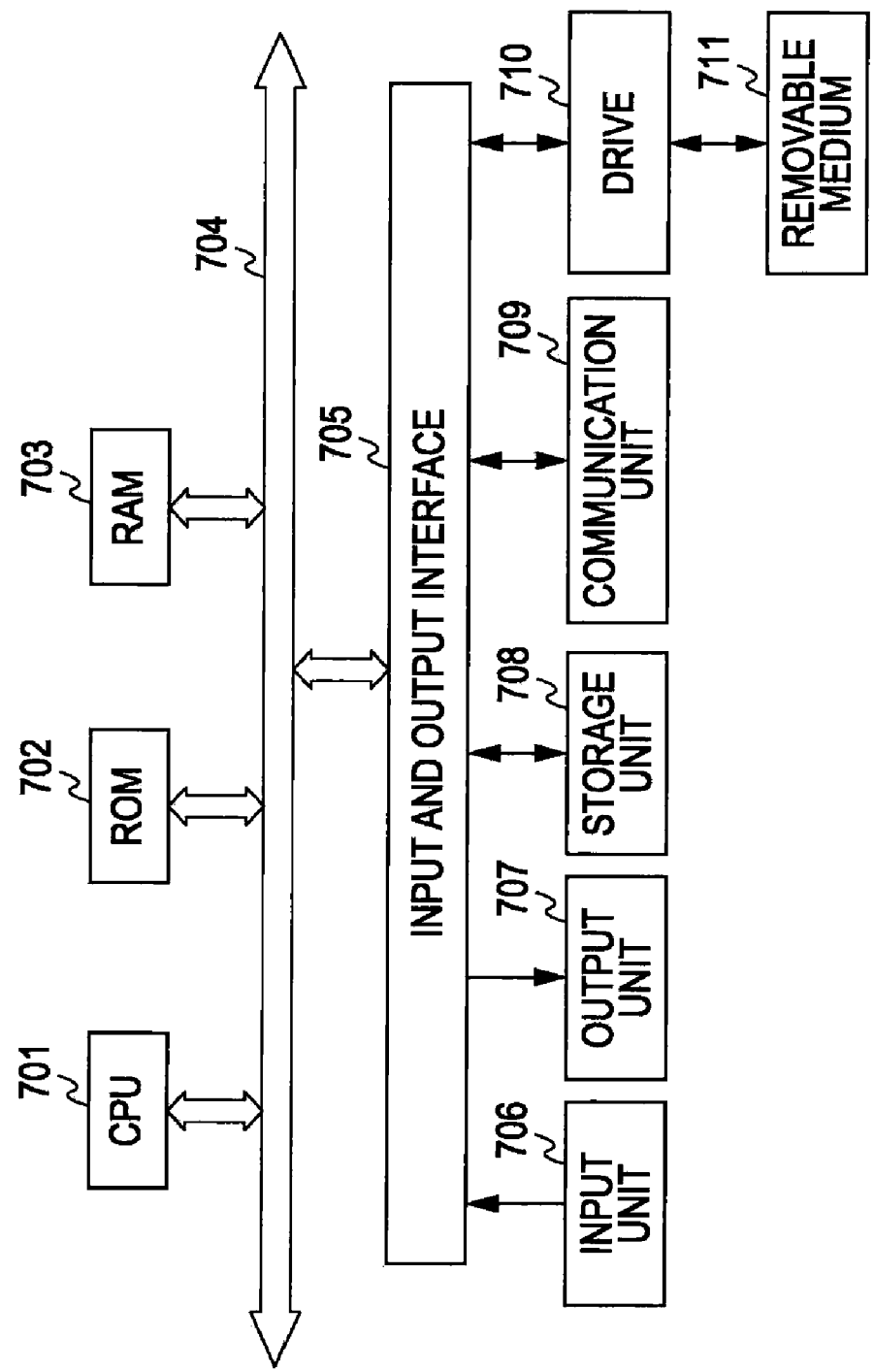
FIG. 19 is a diagram illustrating an exemplary hardware configuration of an image processing apparatus according to an embodiment of the present invention.

Finally, an exemplary hardware configuration of a personal computer which is one of apparatuses executing the above-described processing is described with reference to FIG. 19. A central processing unit (CPU) 701 performs a variety of processing in accordance with a program stored in a read only memory (ROM) 702 or a storage unit 708. For example, the CPU 701 executes processing programs, such as a program of the image correction processing performed by the image correction processing unit (PreFilter) and a program of the super-resolution processing performed by the super-resolution processing unit described in the above-described embodiment. Programs executed by the CPU 701 and data are stored in a random access memory (RAM) 703 as needed. The CPU 701, the ROM 702, and the RAM 703 are connected to each other via a bus 704.

The CPU 701 is connected to an input and output interface 705 via the bus 704. An input unit 706 including a keyboard, a mouse, and a microphone and an output unit 707 including a display and a speaker are connected to the input and output interface 705. In response to an instruction input from the input unit 706, the CPU 701 performs a variety of processing and outputs processing results to, for example, the output unit 707.

The storage unit 708 connected to the input and output interface 705 includes, for example, a hard disk. The storage unit 708 stores a program executed by the CPU 701 and a variety of data. A communication unit 709 communicates with an external apparatus via a network, such as the Internet and a local area network.

A drive 710 connected to the input and output interface 705 drives a removable medium 711, such as a magnetic disk, an optical disk, a magneto-optical disk, or a semiconductor memory, so as to acquire a program and data stored in the removable medium 711. The acquired program and data are transferred to the storage unit 708 as needed, and are stored in the storage unit 708.

While the present invention has been described in detail with reference to particular embodiments, it is to be understood that various modifications and alternatives of the embodiment may be made by those skilled in the art without departing from the scope or spirit of the present invention. That is, the above disclosure is not intended to be limiting and the scope of the invention should be determined by the appended claims and their legal equivalents.

The above-described series of processes can be implemented through hardware, software, or a combination thereof. When the above-described series of processes is implemented through software, the programs having the processing sequence recorded therein can be installed in a memory of a computer incorporated in dedicated hardware or a general-purpose computer that can execute a variety of processing and can be executed. For example, the programs are prerecorded in a recording medium. The programs can be installed in a computer. Alternatively, the programs can be received via a network, such as a local area network (LAN) or the Internet, and subsequently, can be installed in a recording medium, such as an internal hard disk.

In addition, the plurality of processes described in the present specification may be performed not only in the above-described sequence, but also in parallel or independently in accordance with the processing power of the apparatus or as needed. Furthermore, as used in the present specification, the term "system" refers to a logical combination of a plurality of apparatuses; the plurality of apparatuses are not necessarily included in one body.

What is claimed is:

1. An image processing apparatus comprising:
    an image correction processing unit configured to correct an input image so as to generate a corrected image; and
    a super-resolution processing unit configured to receive the corrected image generated by the image correction processing unit and increase a resolution of the corrected image through super-resolution processing so as to generate a high-resolution image;
    wherein the image correction processing unit performs at least one of a time-direction noise removal process, a space-direction noise removal process, a compression noise removal process, and an aperture control correction process; and
    wherein the super-resolution processing unit generates the high-resolution image corresponding to the input image on the basis of a low-resolution image (LR image) received from the image correction processing unit and a high-resolution image (SR image) pregenerated for the previous frame, and wherein the super-resolution processing unit includes a high-resolution difference image generating unit, a time-direction noise removal unit, a first addition processing unit, and a second addition processing unit, and wherein the high resolution difference image generating unit motion compensates the high-resolution image (SR image) on the basis of a motion vector computed using the high-resolution image (SR image) and the low-resolution image (LR image), generates a difference image between the motion-compensated high-resolution image (SR image) and the low-resolution image (LR image), and generates a high-resolution difference image by performing upsampling and inverse motion compensation on the difference image, the time-direction noise removal unit performs removal of noise in the time direction from a low-frequency component-removed image of the high-resolution difference image, the first addition processing unit adds an image processed by the time-direction noise removal unit to a low-frequency component image of the high-resolution difference image, and the second addition processing unit adds an output of the first addition processing unit to the high-resolution image (SR image) so as to generate the high-resolution image corresponding to the received low-resolution image (LR image).

2. The image processing apparatus according to claim 1, wherein
    the image correction processing unit analyzes features of pixels that form the input image so as to obtain analysis information, and wherein the image correction processing unit determines the type of image correction process to be applied in accordance with the analysis information.

3. The image processing apparatus according to claim 1, wherein,
    when analyzing features of the pixels that form the input image, the image correction processing unit analyzes at least one of time-direction correlation information, edge information, and space-direction pixel feature information so as to determine the type of image correction process to be applied in accordance with the analysis information.

4. The image processing apparatus according to claim 3, wherein
    the image correction processing unit acquires the space-direction pixel feature information in the form of at least one of a maximum pixel value, a minimum pixel value, a variance value, an average value, the number of pixels having a luminance higher than or equal to a predetermined threshold value, and the number of pixels having a luminance lower than or equal to a predetermined threshold value of pixels in a pixel region containing pixels surrounding a pixel to be processed.

5. The image processing apparatus according to claim 1, wherein
    the time-direction noise removal unit performs a filtering process using an infinite-duration impulse response (IIR) filter.

6. An image processing method for use in an image processing apparatus for generating a high-resolution image, comprising the steps of:
    correcting an input image so as to generate a corrected image by using an image correction processing unit; and
    receiving the corrected image and increasing a resolution of the corrected image through super-resolution processing so as to generate a high-resolution image by using a super-resolution processing unit;

wherein correcting an input image involves performing at least one of a time-direction noise removal process, a space-direction noise removal process, a compression noise removal process, and an aperture control correction process; and wherein in generating a high-resolution image, the high-resolution image corresponding to the input image is generated on the basis of a low-resolution image (LR image) received from the image correction processing unit and a high-resolution image (SR image) pregenerated for the previous frame, and wherein generating a high-resolution image includes generating a high-resolution difference image, removing a time-direction noise, performing first addition, and performing second addition, and wherein, in generating a high-resolution difference image, the high-resolution image (SR image) is motion-compensated on the basis of a motion vector computed using the high-resolution image (SR image) and the low-resolution image (LR image), a difference image between the motion-compensated high-resolution image (SR image) and the low-resolution image (LR image) is generated, and a high-resolution difference image is generated by performing upsampling and inverse motion compensation on the difference image, and wherein, in removing a time direction noise, removal of noise in the time direction from a low-frequency component-removed image of the high-resolution difference image is performed, and wherein, in performing first addition, an image processed in the step of removing time-direction noise is added to a low-frequency component image of the high-resolution difference image, and wherein, in performing second addition, an output of the step of performing first addition is added to the high-resolution image (SR image) so that the high-resolution image corresponding to the input low-resolution image (LR image) is generated.

7. The image processing method according to claim 6, wherein,
in correcting an input image, features of pixels that form the input image are analyzed so as to obtain analysis information, and the type of image correction process to be applied is determined in accordance with the analysis information.

8. The image processing method according to claim 6, wherein,
in correcting an input image, when features of the pixels that form the input image are analyzed, at least one of time-direction correlation information, edge information, and space-direction pixel feature information is analyzed so that the type of image correction process to be applied is determined in accordance with the analysis information.

9. The image processing method according to claim 8, wherein,
in correcting an input image, the space-direction pixel feature information in the form of at least one of a maximum pixel value, a minimum pixel value, a variance value, an average value, the number of pixels having a luminance higher than or equal to a predetermined threshold value, and the number of pixels having a luminance lower than or equal to a predetermined threshold value of pixels in a pixel region containing pixels surrounding a pixel to be processed is acquired.

10. The image processing method according to claim 6, wherein
removing a time-direction noise involves performing a filtering process using an infinite-duration impulse response (IIR) filter.

11. A non-transitory computer-readable medium storing instructions, which when executed by a processor causes an image processing apparatus to generate a high-resolution image, the generation comprising the steps of:
correcting an input image so as to generate a corrected image by using an image correction processing unit; and
receiving the corrected image and increasing a resolution of the corrected image through super-resolution processing so as to generate a high-resolution image by using a super-resolution processing unit;
wherein correcting an input image involves performing at least one of a time-direction noise removal process, a space-direction noise removal process, a compression noise removal process, and an aperture control correction process; and
wherein in generating a high-resolution image, the high-resolution image corresponding to the input image is generated on the basis of a low-resolution image (LR image) received from the image correction processing unit and a high-resolution image (SR image) pregenerated for the previous frame, and wherein generating a high-resolution image includes generating a high-resolution difference image, removing a time direction noise, performing first addition, and performing second addition, and wherein, in generating a high-resolution difference image, the high-resolution image (SR image) is motion-compensated on the basis of a motion vector computed using the high-resolution image (SR image) and the low-resolution image (LR image), a difference image between the motion-compensated high-resolution image (SR image) and the low-resolution image (LR image) is generated, and a high-resolution difference image is generated by performing upsampling and inverse motion compensation on the difference image, and wherein, in removing a time-direction noise, removal of noise in the time direction from a low-frequency component-removed image of the high-resolution difference image is performed, and wherein, in performing first addition, an image processed in the step of removing time-direction noise is added to a low-frequency component image of the high-resolution difference image, and wherein, in performing second addition, an output of the step of performing first addition is added to the high-resolution image (SR image) so that the high-resolution image corresponding to the input low-resolution image (LR image) is generated.

* * * * *